(12) United States Patent  
Larson

(10) Patent No.: US 6,636,232 B2
(45) Date of Patent: Oct. 21, 2003

(54) POLYGON ANTI-ALIASING WITH ANY NUMBER OF SAMPLES ON AN IRREGULAR SAMPLE GRID USING A HIERARCHICAL TILER

(75) Inventor: Ronald D Larson, Ft Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 262 days.

(21) Appl. No.: 09/759,717

(22) Filed: Jan. 12, 2001

(65) Prior Publication Data

US 2002/0093520 A1 Jul. 18, 2002

(51) Int. Cl.[7] .................................................. G09G 5/02
(52) U.S. Cl. ........................ 345/611; 345/418; 345/441; 345/612
(58) Field of Search ................................. 345/611, 441, 345/612, 418

(56) References Cited

U.S. PATENT DOCUMENTS

| | | | | |
|---|---|---|---|---|
| 5,123,085 A | * | 6/1992 | Wells et al. ................. 345/421 |
| 5,432,898 A | * | 7/1995 | Curb et al. ................. 345/443 |
| 5,544,294 A | * | 8/1996 | Cho et al. .................. 345/441 |
| 5,668,940 A | * | 9/1997 | Steiner et al. .............. 345/429 |
| 5,818,456 A | * | 10/1998 | Cosman et al. ............. 345/434 |
| 6,057,855 A | * | 5/2000 | Barkans ...................... 345/435 |
| 6,377,273 B1 | * | 4/2002 | Lee et al. .................... 345/611 |
| 6,384,839 B1 | * | 5/2002 | Paul ............................ 345/613 |
| 6,489,966 B1 | * | 12/2002 | Kanzaki et al. ............. 345/613 |

* cited by examiner

Primary Examiner—Dennis-Doon Chow
Assistant Examiner—Fritz Alphonse
(74) Attorney, Agent, or Firm—Leslie P. Gehman

(57) ABSTRACT

An apparatus and method of selectively over-sampling image data, anti-aliasing of polygons that produces quality images comparing favorably to full over-sampling techniques while requiring less computation than full over-sampling techniques. Using a hierarchical tiler to perform edge calculations for any given polygon, and then selectively over-sampling pixels along the edge, image quality may be greatly improved through anti-aliasing the polygon edges, with a small increase in computation time or hardware.

13 Claims, 23 Drawing Sheets

POLYGON ANTI-ALIASING WITH ANY NUMBER OF SAMPLES ON AN IRREGULAR SAMPLE GRID USING A HIERARCHICAL TILER

FIELD OF THE INVENTION

The present invention relates to a computer graphics display system and, more particularly, to a method and apparatus for performing polygon anti-aliasing in a computer graphics display system.

BACKGROUND OF THE INVENTION

In three-dimensional (3-D) computer graphics display systems, primitives are rendered on a display device of the computer graphics display system to produce a visual image on the display device. Computer graphics workstations are used for a number of different applications such as computer-aided design (CAD) and computer-aided manufacturing (CAM). These applications often require three dimensional (3D) modeling capability and great speed in rendering complicated models.

One possible embodiment of a computer graphics accelerator is shown in FIG. 2. This system is described in detail below. For now, note that the scan converter 206 receives vertex data and plane equations from the front end and turns them into spans of pixels. Scan conversion is a process that determines the exact pixel locations on the screen of a display device that correspond to graphics primitives. Scan conversion is commonly performed by an edge stepper engine that steps down along the edges of a primitive until a point on the edge of the primitive is reached where the primitive intersects a scan line, and then steps across the span corresponding to the scan line to determine the point of the opposite side of the primitive where the scan line intersects the primitive.

One disadvantage of the typical approach to performing scan conversion is that it results in one-dimensional locality of pixels because of the manner in which an entire span of pixels are obtained for a scan line in the x direction (i.e., horizontal), before the next span of pixels is obtained for the next scan line. This results in one-dimensional grouping of pixels, i.e., grouping in terms of the x dimension in screen space. This is a less than optimal structure for storing pixel data since pixels that may be adjacent vertically are stored far from each other, and may require substantial calculations to convert the one-dimensional array of pixels into a configuration enabling fast access along both the horizontal and vertical dimensions.

Also, a common method of scan conversion through edge stepping may leave the edge of the primitive in a state with aliasing along the edges. Anti-aliasing of the edge would have to be performed later in the graphics hardware pipeline. Standard anti-aliasing techniques may be used to reduce this problem. However, many of the better techniques are computation intensive, requiring either more hardware or more time for processing. Thus, there is a need in the art for techniques that improve the quality of the image while keeping computing time to a minimum.

SUMMARY OF THE INVENTION

Image data is selectively over-sampled to produce quality images comparing favorably to full over-sampling techniques, while requiring less computation than full over-sampling techniques. A hierarchical tiler performs edge calculations for any given polygon, pixels are selectively over-sampling along the edge. This improves image quality by anti-aliasing the polygon edges, with a small increase in computation time or hardware when compared to other techniques.

Other aspects and advantages of the present invention will become apparent from the following detailed description, taken in conjunction with the accompanying drawings, illustrating by way of example the principles of the invention.

DETAILED DESCRIPTION

Figure 1:
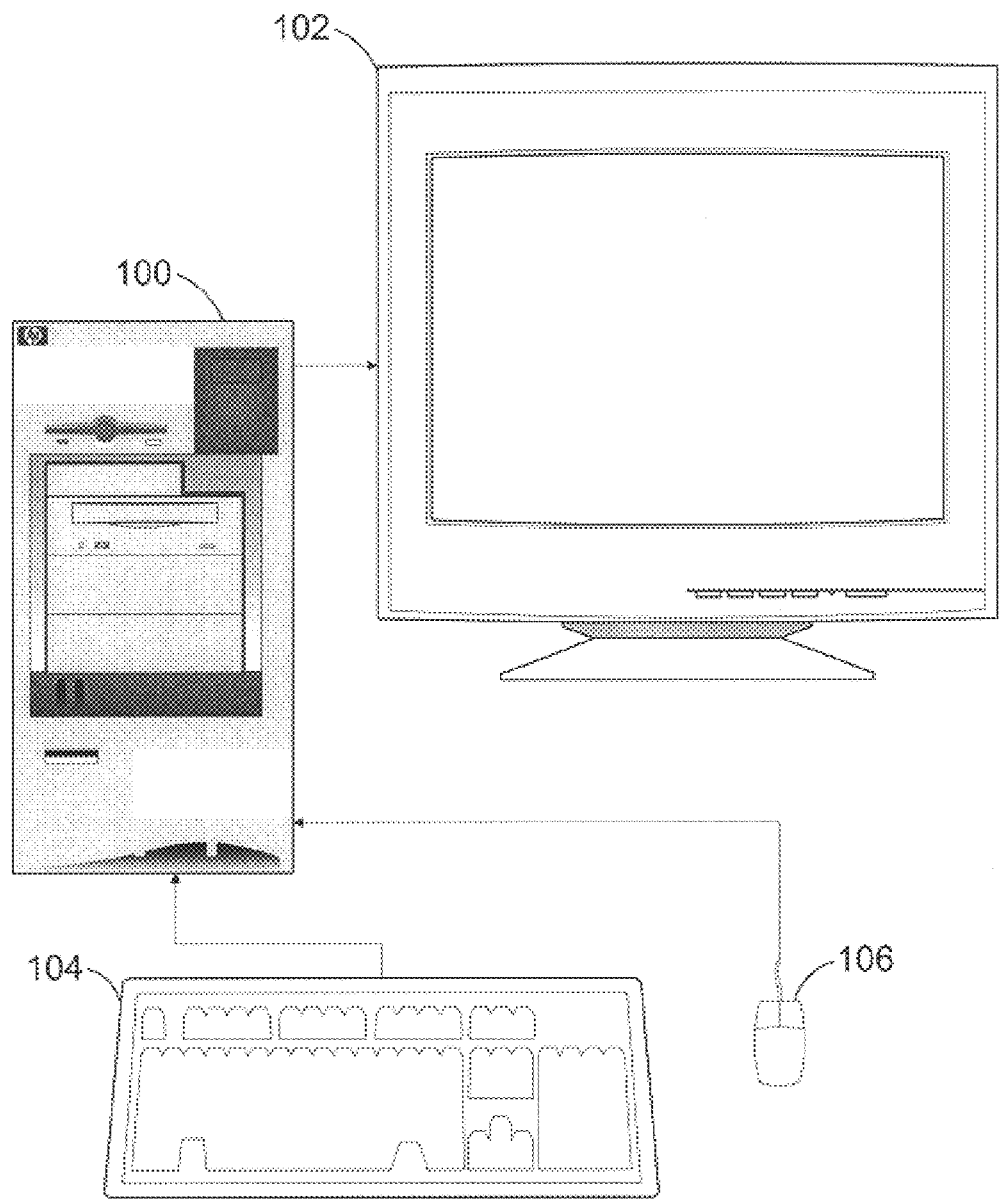
FIG. 1 is a diagram of a computer system.

Most computer systems include hardware dedicated to the display of graphics on a monitor. One illustrative system is shown in FIG. 1. The computer 100 is controlled by a user with a keyboard 104 and a mouse 106. The output of the computer is displayed on the monitor 102.

Figure 2:
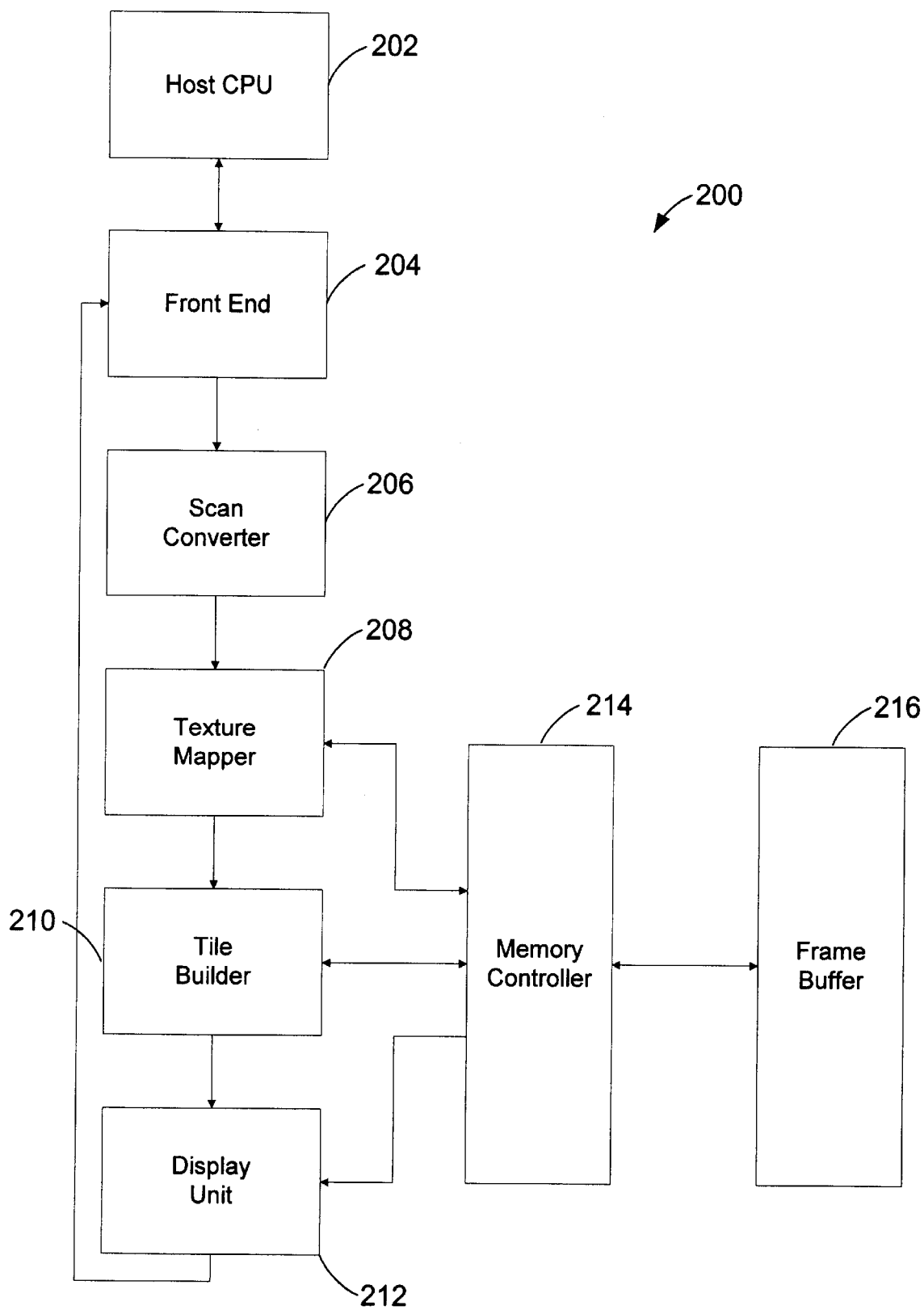
FIG. 2 is a block diagram of a computer graphics system.

A block diagram of the graphics hardware for one such configuration is shown in FIG. 2. The graphics system 200 consists of a number of blocks of circuitry that communicate with each other and the host central processing unit (CPU) 202. The host CPU 202 does the work of generating the graphical image in terms that the graphics system 200 understands. Typically, objects are divided into triangles and the vertices of the triangles are sent to the graphics system 200 for display. The front end 204 of the graphics system 200 controls communication with the host CPU 202. The front end 204 may request information from the host CPU 202 or receive graphics data from the host CPU 202 to then be passed along to the rest of the graphics system 200 hardware. The scan converter 206 receives vertex data and plane equations from the front end and turns them into spans of pixels. Scan conversion (or rasterization) may be accomplished by the use of any of several algorithms known in the art. One possible implementation of the present invention resides within the scan converter, and will be discussed in detail below. Since most computer memory is most efficiently accessed in blocks of data, the graphics data must be assembled into appropriate sized tiles. This task is performed by the tile builder 208. The tile builder 208 also sends and receives tiles to and from the frame buffer 216 through the memory controller 214. The frame buffer 216 typically consists of video random access memory (VRAM) and is used to store the pixel data for the image while the graphics system 200 is creating the pixel data before it is displayed on the monitor. See FIG. 4 for an example of one implementation of a frame buffer 216. The texture mapper 210 applies textures to surfaces. These textures are stored in memory in the frame buffer 216 for application to surfaces being displayed. The display unit 212 formats pixel data and sends the data through digital-to-analog converters (DACs) to the monitor. Within the display unit 212, pixel data from the frame buffer 216 is formatted for display on the monitor. Also, the data must transition from the clock domain of the graphics system 200 to that of the digital-to-analog (D/A) converter for display. This is typically done through asynchronous first-in-first-out memories (FIFOs).

Figure 3:
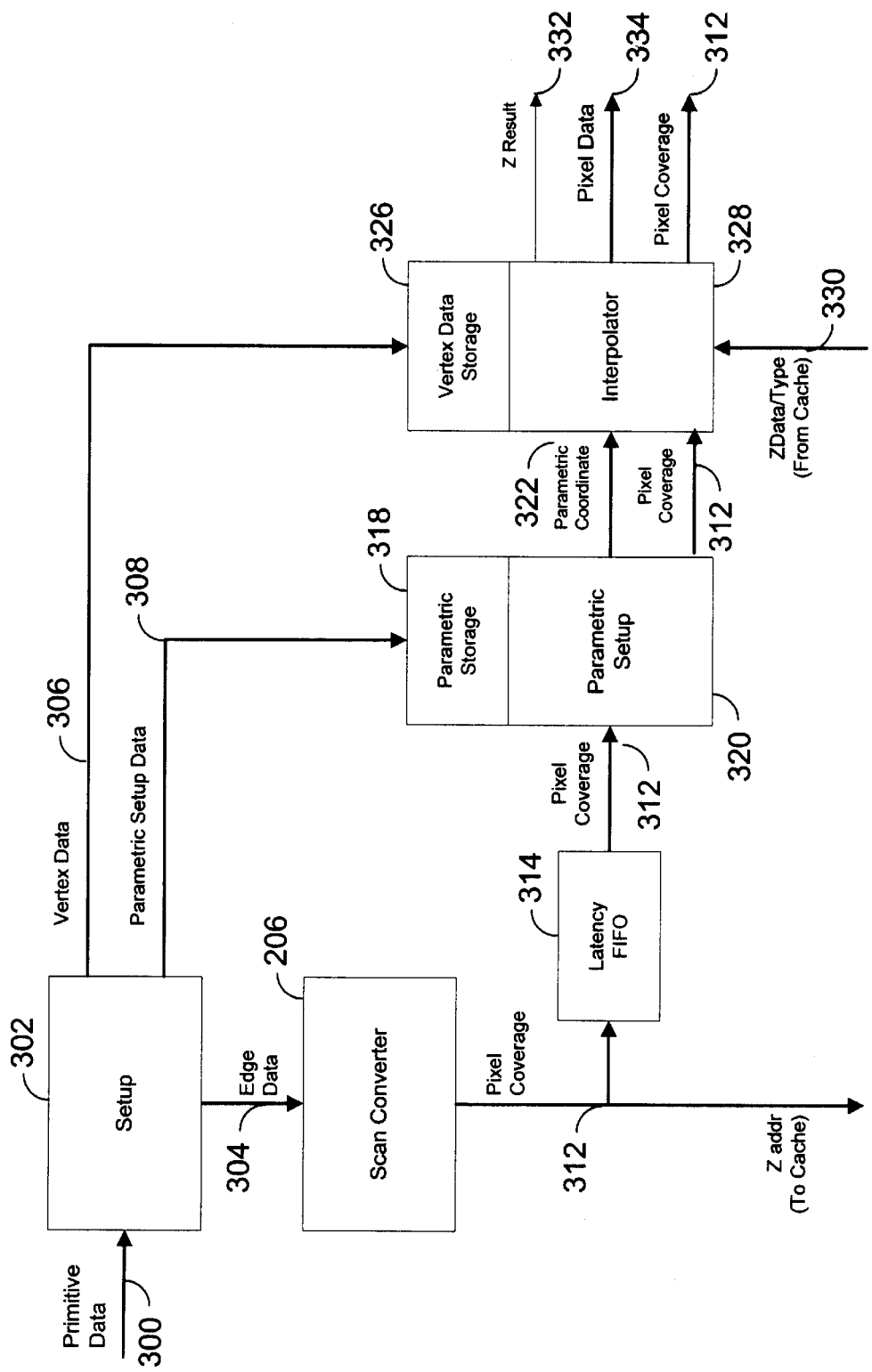
FIG. 3 is a block diagram of a computer graphics system rasterizer.

FIG. 3 is a block diagram of a computer graphics system rasterizer. Primitive data 300 enters the setup block 302 where edge data 304, vertex data 306, and parametric setup data 308 is extracted. The setup block 302 receives vertex data for primitives such as triangles, triangle strips, triangle fans, lines, polylines, or points (primitive data 300). The vertices are grouped to form simple primitives (triangles, lines, and points). The setup block 302 calculates the triangle edge equations used by the scan converter 206 block, the per primitive parametric setup data 308 used by the parametric setup 320 block, and the vertex data 306 used by the interpolator 328 block.

The edge data 304 is sent to the scan converter 206 where it is converted to pixel coverage data 312. The scan converter 206 receives triangle edge equations (edge data 304) and generates the screen (x, y) coverage (pixel coverage data 312). The pixel coverage data 312 is in the form of a (x, y) address and a mask. The mask indicates the number of sub-pixel samples that are covered in the pixel. In an example embodiment, the pixel coverage data 312 passes through a latency FIFO 314 (first-in-first-out memory), before continuing on to a parametric setup 320 block and an interpolator 328 block. In an example embodiment, the scan converter 206 can be set to sample 1, 2, 4, 8, or 16 samples per pixel. In an example embodiment, the scan converter 206 uses a hierarchical tiling method (described further in a U.S. patent application, application No. 09/190,666, 'A Method and Apparatus for Performing Scan Conversion in a Computer Graphics Display System', filed on Nov. 12, 1998, hereby incorporated herein by reference). This hierarchical tiling method will be described in greater detail in discussion for FIG. 4 through FIG. 19. The hierarchical tiler tests each triangle edge against a quantity of pixel regions to determine if the region is inside the triangle, outside the triangle, or requires further testing. The tiler begins tiling at a resolution that completely bounds the triangle being processed, and recursively subdivides the regions until pixel or sub-pixel samples are obtained.

The per-primitive parametric setup data 308 are stored in the parametric storage 318 block. The (x, y) and mask data is passed from the parametric storage 318 block to the parametric setup 320 block where the parametric coordinates 322 (a, b) are generated. In an example embodiment, for anti-aliasing, up to 16 different (a, b) coordinates are generated for the multiple depth (Z) samples. Only one parametric coordinate 322 is generated per pixel for parameters other than depth (Z). The parametric setup 320 uses data from the parametric storage 318 block to calculate the (a, b) values. Edges for triangles are defined by the equation $a*(x-x0)+b*(y-y0)$. The sign of the result specifies which side of the edge that the point (x, y) is on. Values of 0 indicate that the point lies directly on the edge. A is simply $(y2-y1)$ and b is simply $(x1-x2)$, where $(x1, y1)$ and $(x2, y2)$ are the end points of the edge.

The vertex data 306 are stored in the vertex data storage 326 block. In an example embodiment, several data parameters may be stored for each triangle. Four data parameters at a time are sent to the interpolators 328. The interpolators 328 use the parametric coordinates 322 to interpolate the pixel data 334 from the vertex data 306. In an example embodiment, the interpolators may also be used to generate values for gradient calculations within an optional texture block 208. In an example embodiment, there are four interpolators in each interpolator 328 block, allowing the interpolation of four pixel data parameters at once. In an example embodiment, the interpolator 328 block includes four depth (Z) compare units, allowing four depth comparisons at once. The interpolators receive Z data 330 from a cache and output a Z result 332.

Figure 3B:
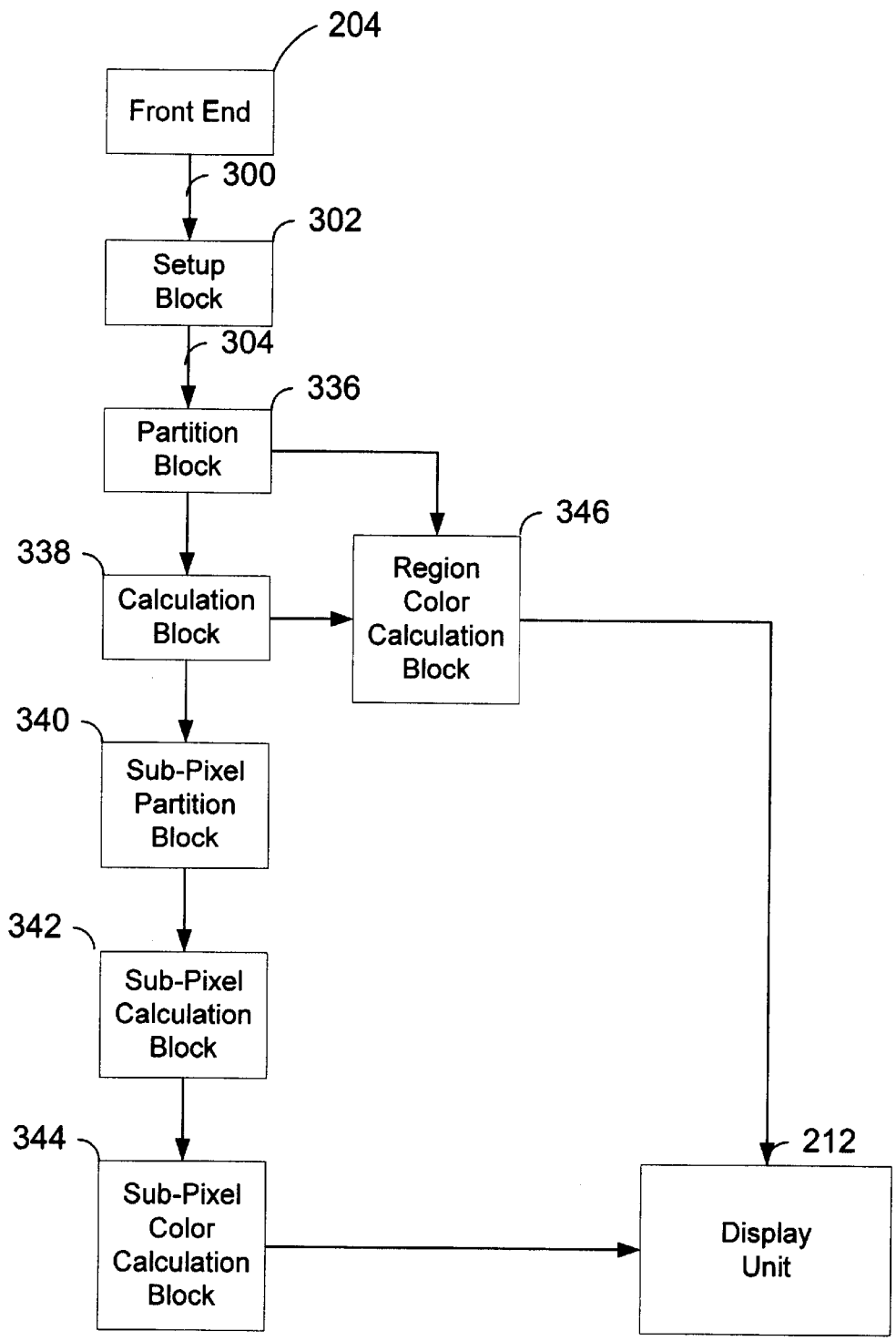
FIG. 3B is a block diagram of a computer graphics system hierarchical scan converter.

FIG. 3B is a block diagram of a computer graphics system hierarchical scan converter. The computer front end 204 sends primitive data 300 to a setup block 302. The setup block 302 converts the primitive data 300 to primitive edge data 304 which is then passed to a partition block 336. The partition block 336 divides the display into regions and then sends the region data along with the edge data to a calculation block 338 and a region color calculation block 346. The calculation block 338 determines which of the regions contain a primitive edge and passes this data to the region color calculation block 346 and a sub-pixel partition block 340. The region color calculation block 346 then determines colors for the regions that are completely within a primitive and the regions that are completely outside of a primitive and sends the resulting color data to the display unit 212. The sub-pixel partition block 340 divides the regions containing primitive edges into sub-pixel regions and passes the resulting data to a sub-pixel calculation block 342. The sub-pixel calculation block 342 then, for fewer than all of the sub-pixel regions, determines whether each of the chosen sub-pixel regions is entirely outside of the primitive, entirely inside of the primitive, or partially inside of the primitive, and passes the resulting data to a sub-pixel color calculation block 344. The sub-pixel color calculation block 344 calculates a color for the region using the sub-pixel region data from the sub-pixel calculation block 342. A variety of methods may be used to select a color for the region from the under-sampled sub-pixel data. The sub-pixel color calculation block 344 then sends the color for the region to the display unit 212 where the color data is formatted for viewing on a computer graphics display 102.

Figure 4:
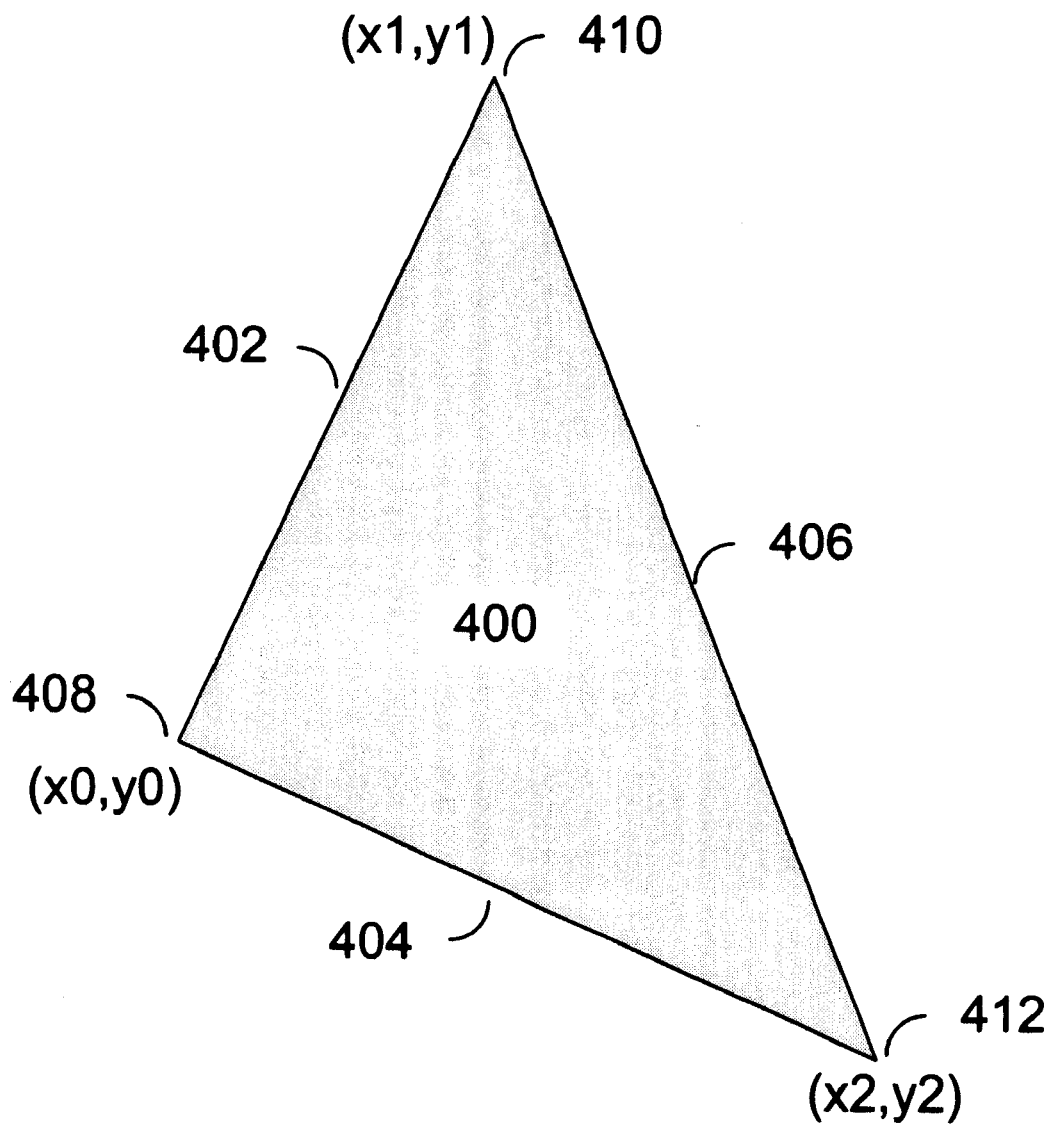
FIG. 4 is a diagram of an example triangle for display by a computer graphics system.

FIG. 4 is a diagram of an example triangle for display by a computer graphics system. The example triangle 400 has three vertices; a first vertex 408 at point (x0,y0), a second vertex 410 at point (x1, y1), and a third vertex 412 at (x2,y2). The example triangle 400 has three edges; a first edge 402, a second edge 404, and a third edge 406.

Figure 5:
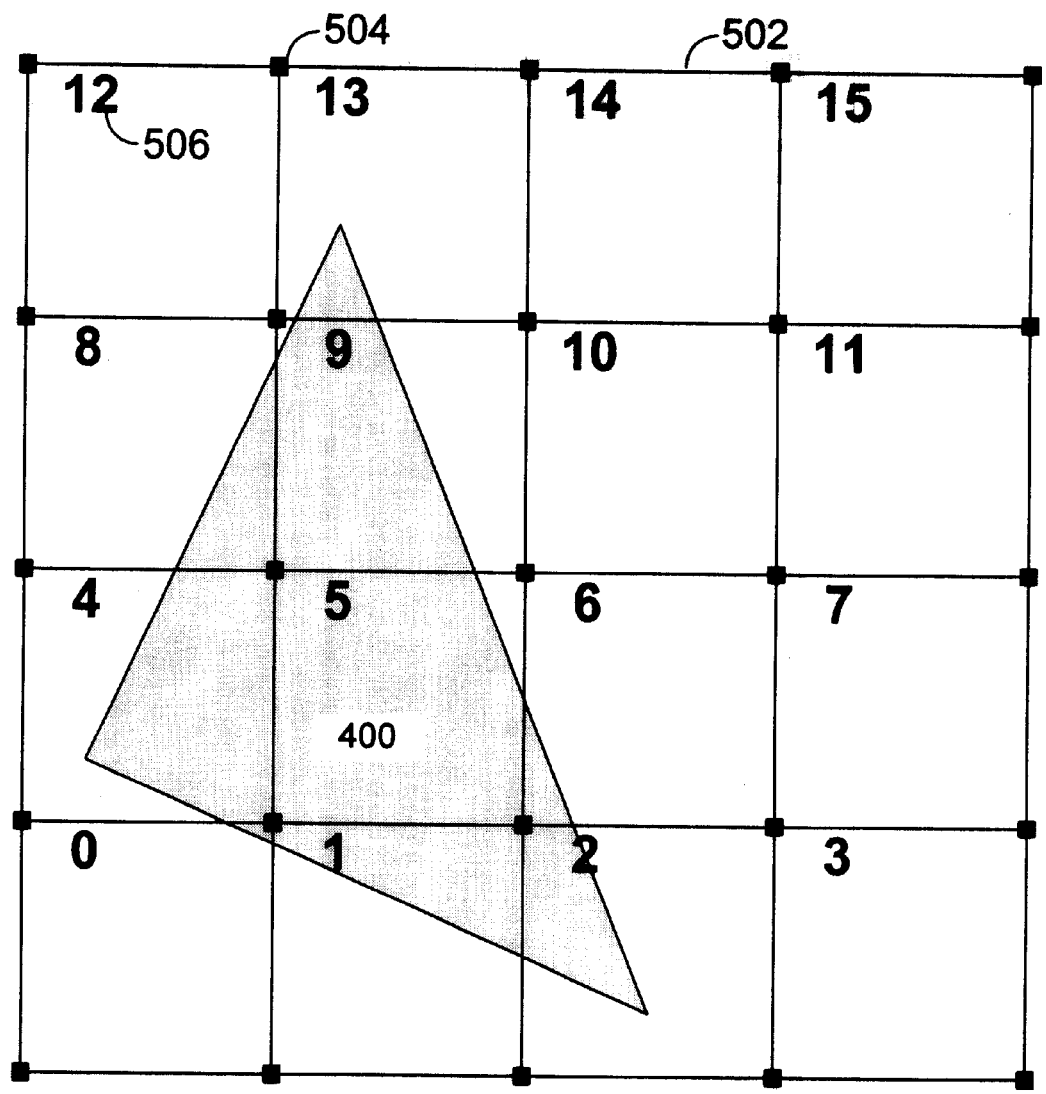
FIG. 5 is a diagram of the example triangle from FIG. 4 superimposed on a grid defining pixel regions of a computer display.

FIG. 5 is a diagram of the example triangle from FIG. 4 superimposed on a grid defining pixel regions of a computer display. In this example embodiment, 16 pixel regions 502 numbered 0 through 15 are superimposed on the example triangle 400. For example region 12 506 is located in the upper left corner. Each intersection point 504 does not necessarily represent a pixel location.

Figure 6:
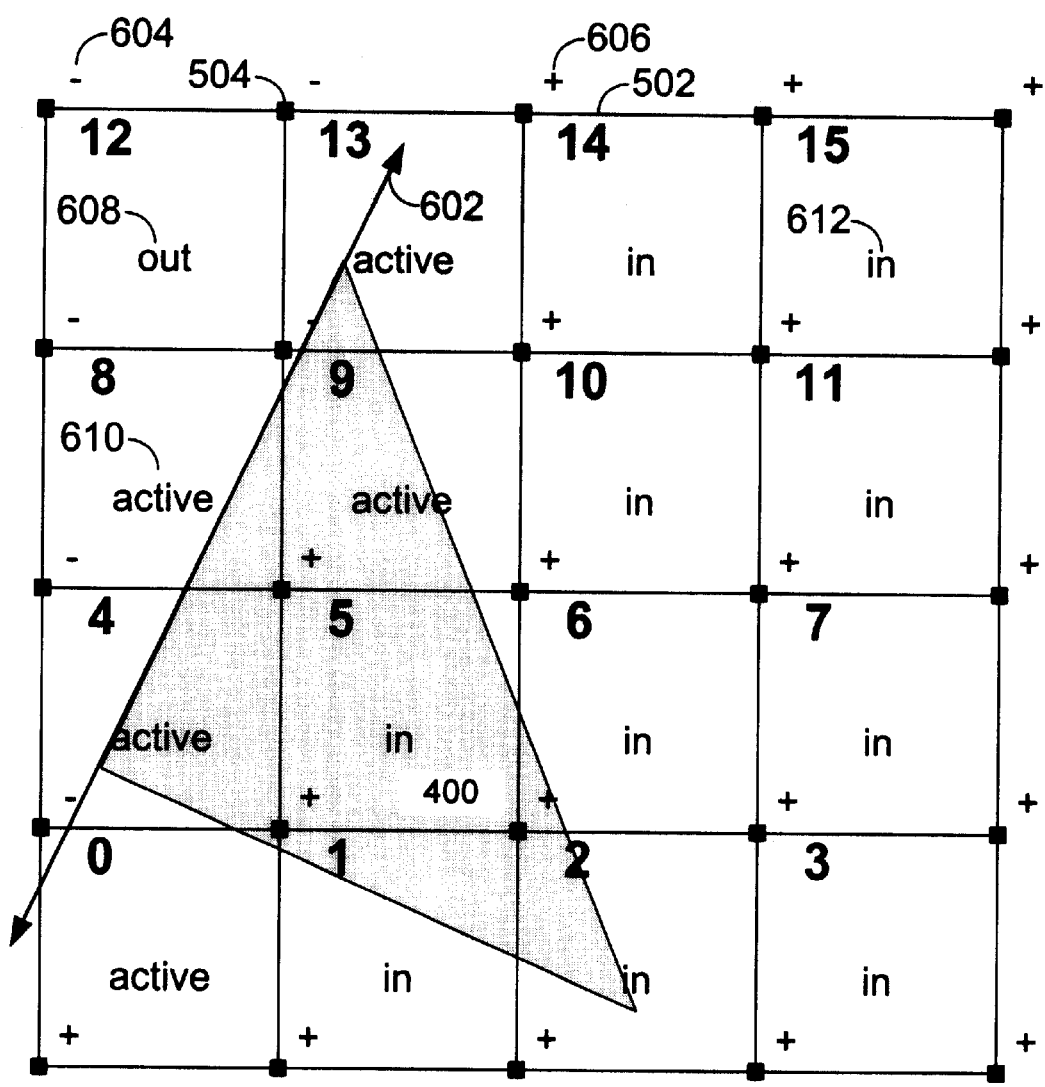
FIG. 6 is a graphical representation of the calculations performed in determining the location of an edge of the example triangle from FIG. 4 with respect to the pixel regions of a computer display from FIG. 5.

FIG. 6 is a graphical representation of the calculations performed in determining the location of an edge of the example triangle from FIG. 4 with respect to the pixel regions of a computer display from FIG. 5. In FIG. 6, the first edge of the triangle is expanded into a first edge line 602 of length sufficient to completely cross the display area under consideration. From the line equation for this line, each intersection point 504 is examined to see if it lies within the triangle 400 relative to the first edge. Each intersection point 504 that lies within the triangle 400 relative to the first edge is shown with a '+' sign 606. Each intersection point 504 that lies outside of the triangle 400 relative to the first edge is shown with a '−' sign 604. If all four of the intersection points 504 defining a grid square are positive, the grid square is 'in' 612. If all four of the intersection points 504 defining a grid square are negative, grid square is 'out' 608. If any of the four intersection points 504 defining a grid square are different from the rest, then the first edge of the triangle passes through that grid square and the grid square is 'active' 610.

Figure 7:
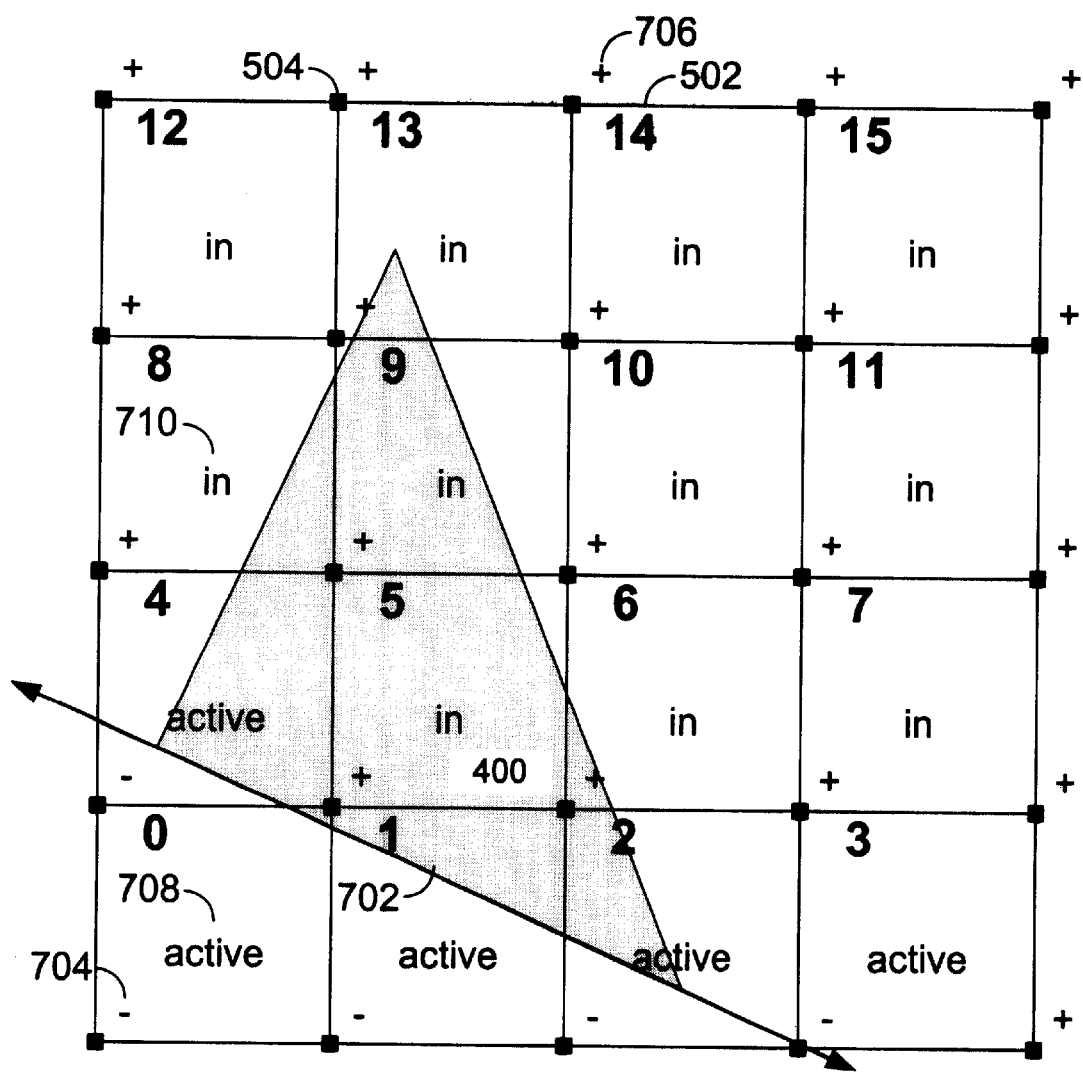
FIG. 7 is a graphical representation of the calculations performed in determining the location of another edge of the example triangle from FIG. 4 with respect to the pixel regions of a computer display from FIG. 5.

FIG. 7 is a graphical representation of the calculations performed in determining the location of another edge of the example triangle from FIG. 4 with respect to the pixel regions of a computer display from FIG. 5. In FIG. 7, the second edge of the triangle is expanded into a second edge line 702 of length sufficient to completely cross the display area under consideration. From the line equation for this line, each intersection point 504 is examined to see if it lies within the triangle 400 relative to the first edge. Each intersection point 504 that lies within the triangle 400 relative to the second edge is shown with a '+' sign 706. Each intersection point 504 that lies outside of the triangle 400 relative to the second edge is shown with a '−' sign 704. If all four of the intersection points 504 defining a grid square are positive, the grid square is 'in' 710. If all four of the intersection points 504 defining a grid square are negative, the grid square is 'out'. If any of the four intersection points 504 defining a grid square are different from the rest, then the second edge of the triangle passes through that grid square and the grid square is 'active' 708.

Figure 8:
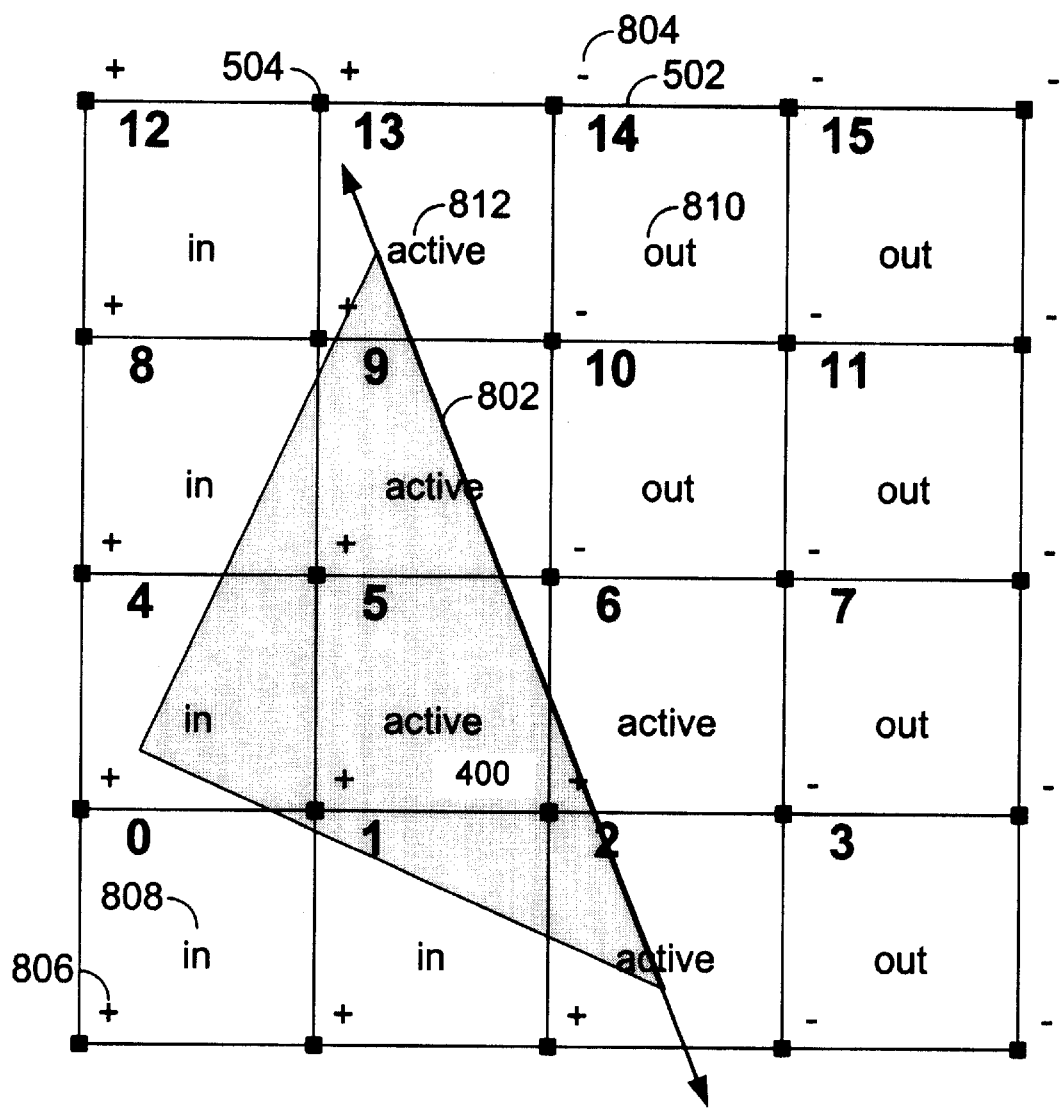
FIG. 8 is a graphical representation of the calculations performed in determining the location of the last edge of the example triangle from FIG. 4 with respect to the pixel regions of a computer display from FIG. 5.

FIG. 8 is a graphical representation of the calculations performed in determining the location of the last edge of the example triangle from FIG. 4 with respect to the pixel regions of a computer display from FIG. 5. In FIG. 8, the first edge of the triangle is expanded into a third edge line 802 of length sufficient to completely cross the display area under consideration. From the line equation for this line, each intersection point 504 is examined to see if it lies within the triangle 400 relative to the third edge. Each intersection point 504 that lies within the triangle 400 relative to the third edge is shown with a '+' sign 806. Each intersection point 504 that lies outside of the triangle 400 relative to the third edge is shown with a '−' sign 804. If all four of the intersection points 504 defining a grid square are positive, the grid square is 'in' 808. If all four of the intersection points 504 defining a grid square are negative, the grid square is 'out' 810. If any of the four intersection points 504 defining a grid square are different from the rest, then the third edge of the triangle passes through that grid square and the grid square is 'active' 812.

Figure 9:
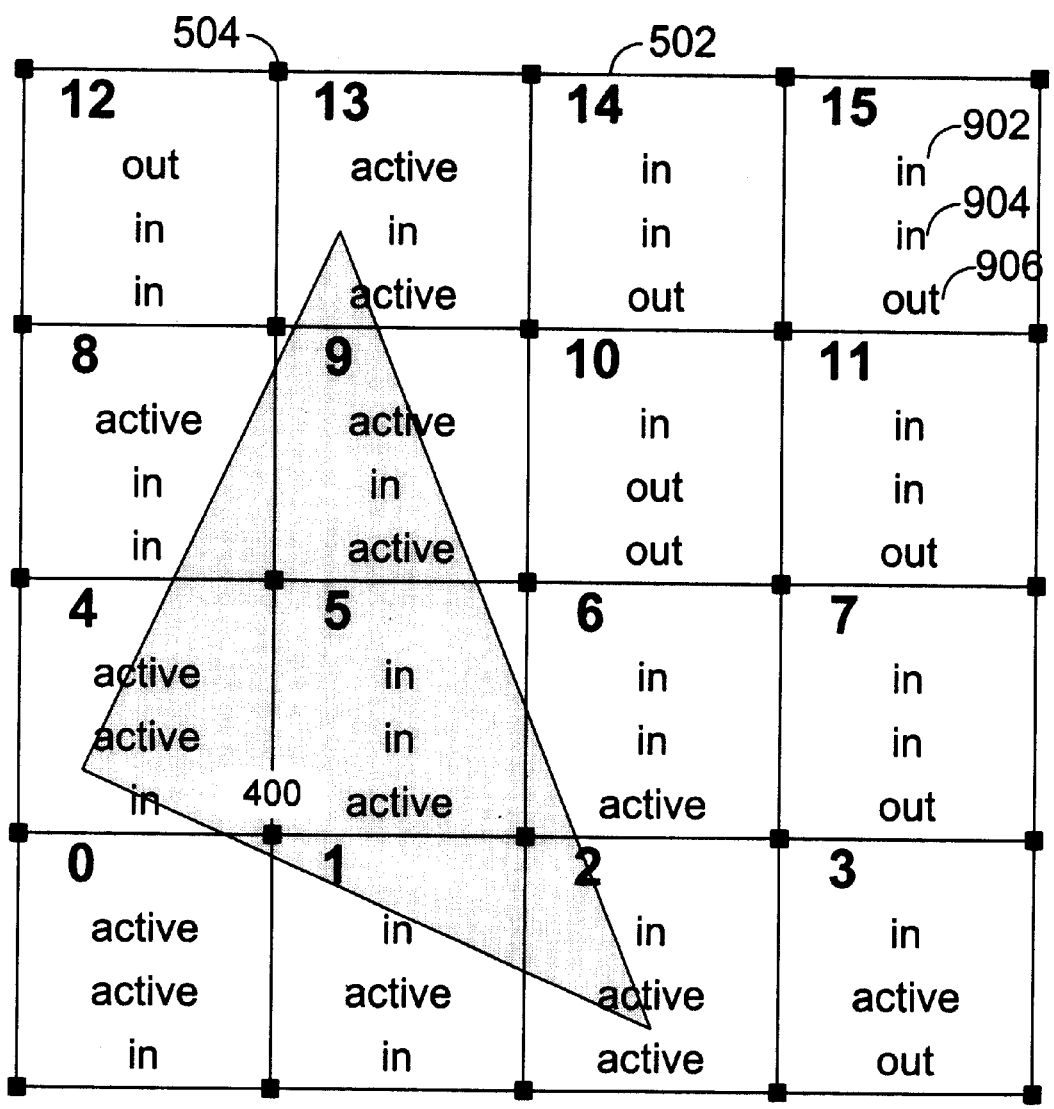
FIG. 9 is a graphical representation of the results of the calculations performed in determining the locations of all three edges of the example triangle from FIG. 4 with respect to the pixel regions of a computer display from FIG. 5.

FIG. 9 is a graphical representation of the results of the calculations performed in determining the locations of all three edges of the example triangle from FIG. 4 with respect to the pixel regions of a computer display from FIG. 5. A determination of the status of each pixel region is made by considering the status of each region with respect to each edge of the triangle 400. In FIG. 9 the results for each region with respect to the first edge of the triangle are shown on top 902. The results for each region with respect to the second edge of the triangle are shown in the middle 904. The results for each region with respect to the third edge of the triangle are shown on the bottom 906.

Figure 10:
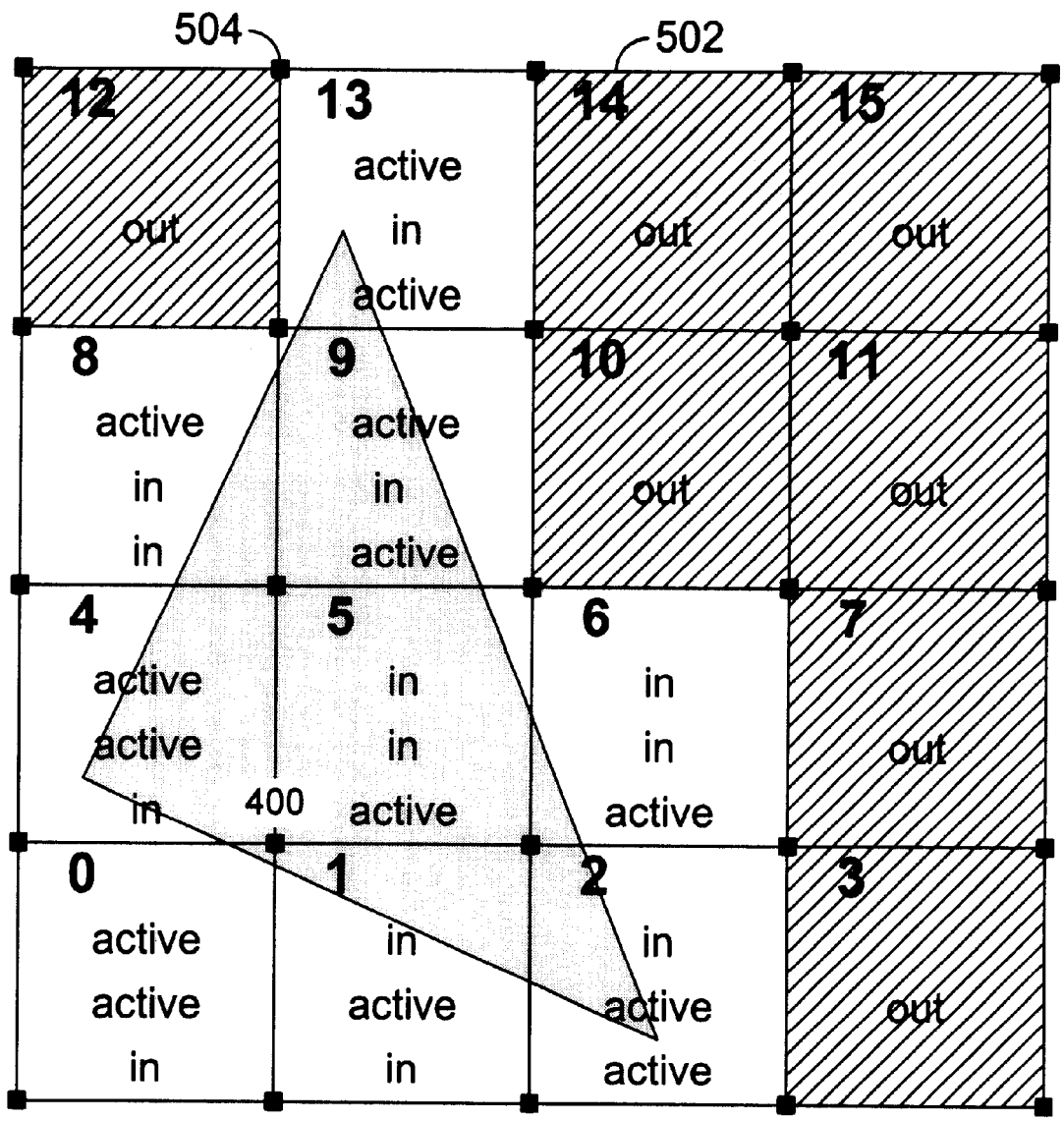
FIG. 10 is a graphical representation of the calculation results from FIG. 9 with all of the pixel regions that have been determined to be outside of the example triangle from FIG. 4 crosshatched.

FIG. 10 is a graphical representation of the calculation results from FIG. 9 with all of the pixel regions that have been determined to be outside of the example triangle from FIG. 5 crosshatched. If any individual result within a given region is 'out', the region is 'out'. Thus pixel regions 3, 7, 10, 11, 12, 14, and 15 are considered 'out' and are shown crosshatched.

Figure 11:
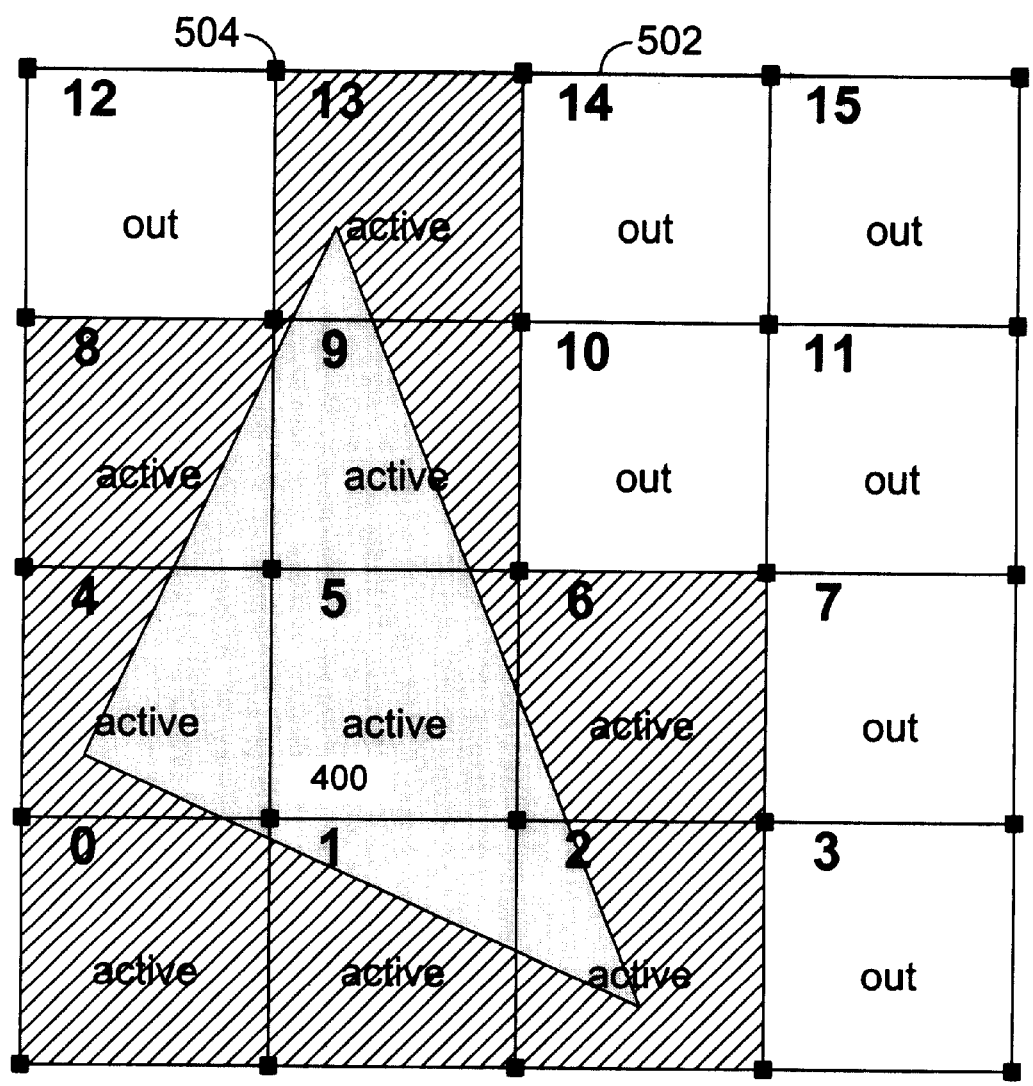
FIG. 11 is a graphical representation of the calculation results from FIG. 9 with all of the pixel regions that have been determined to be active crosshatched.

FIG. 11 is a graphical representation of the calculation results from FIG. 9 with all of the pixel regions that have been determined to be active crosshatched. If all individual results within a given region are 'in', the region is 'in'. In this example, none of the pixel regions are completely enclosed by the triangle 400 so none of the pixel regions are 'in'. If at least one individual result is 'active', and the rest are either 'active' or 'in', the region is 'active'. Thus pixel regions 0, 1, 2, 4, 5, 6, 8, 9, and 13 are considered 'active' and are shown crosshatched.

Figure 12:
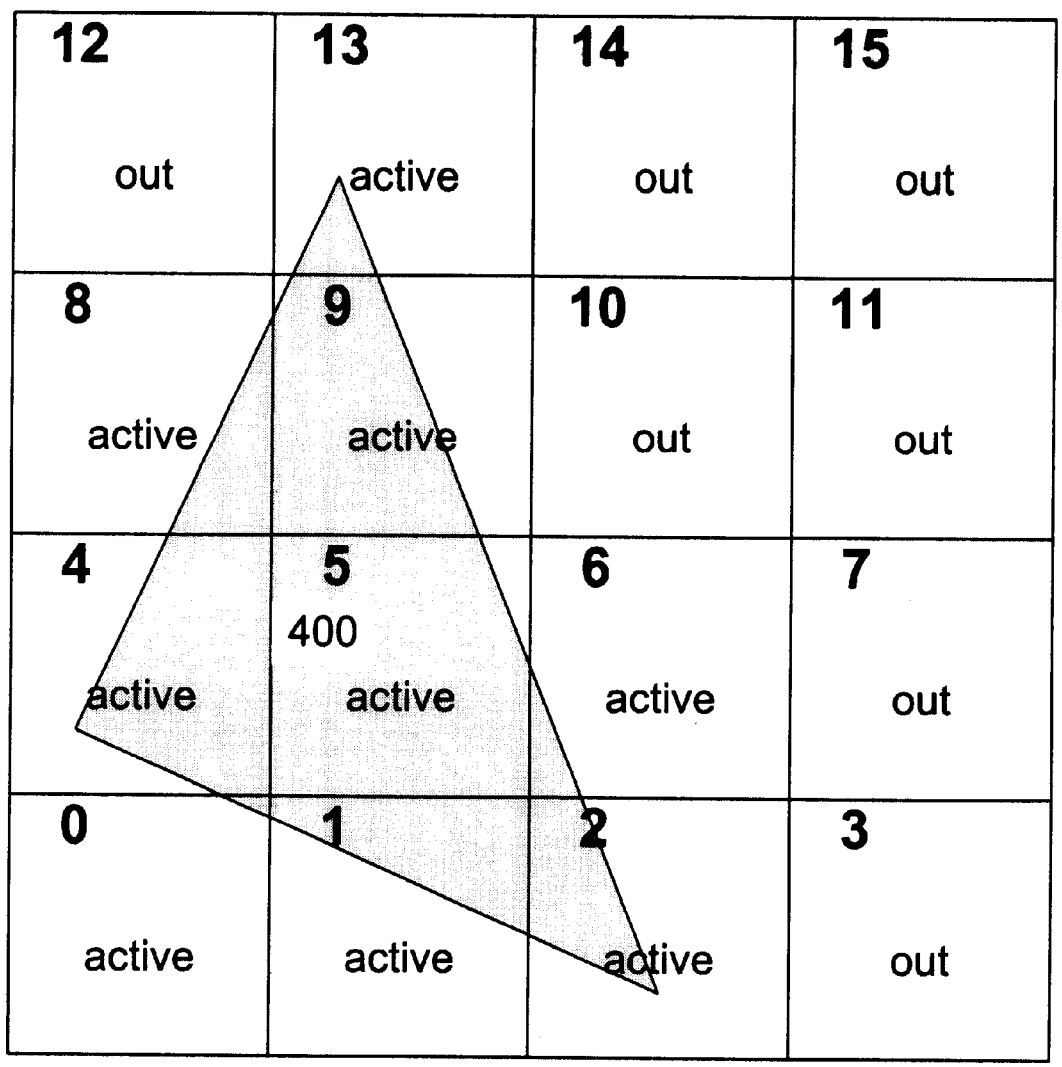
FIG. 12 is a graphical representation of the results from FIG. 10 and FIG. 11 shown with respect to the pixel regions from FIG. 5.

FIG. 12 is a graphical representation of the results from FIG. 10 and FIG. 11 shown with respect to the pixel regions from FIG. 5.

Figure 13:
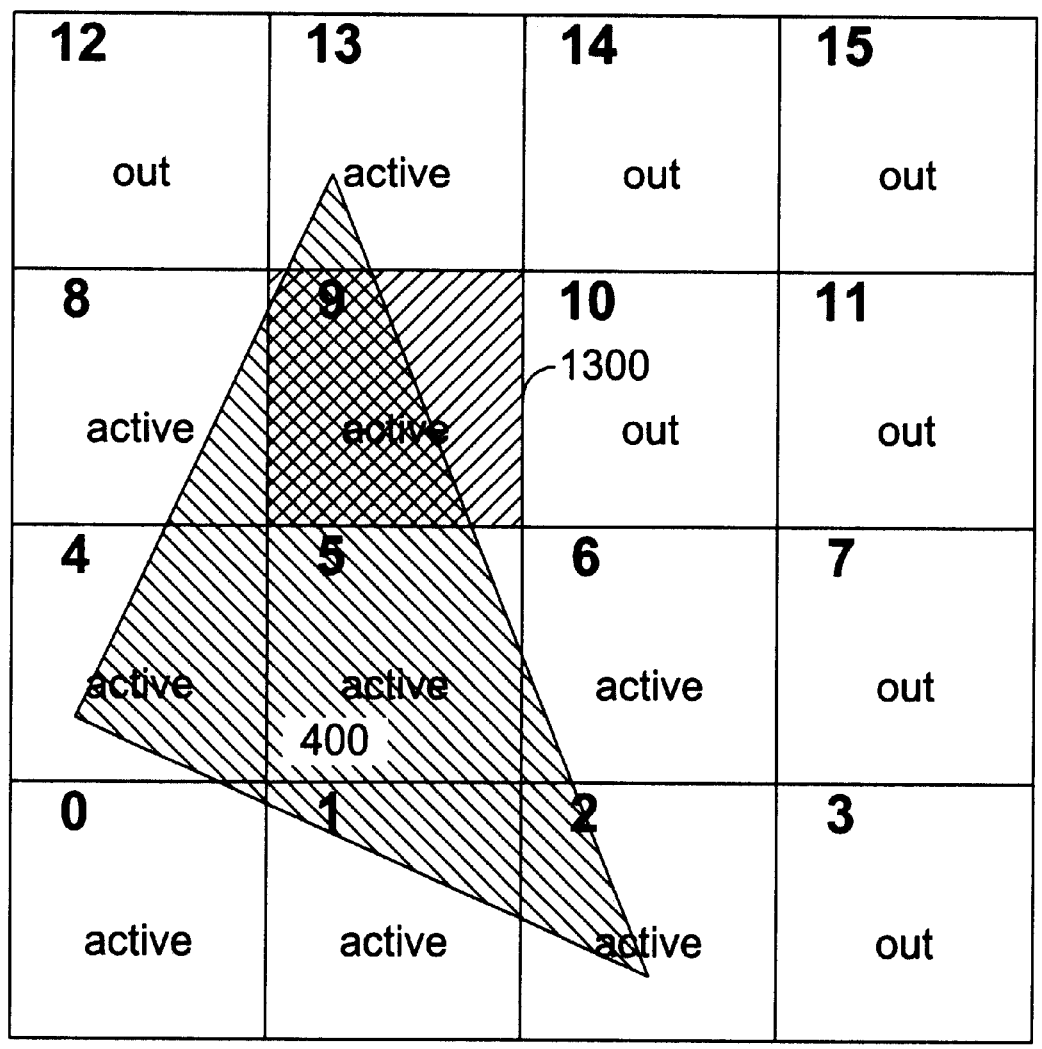
FIG. 13 is a graphical representation of the results from FIG. 12 shown with one of the pixel regions from FIG. 5 selected for further processing.

FIG. 13 is a graphical representation of the results from FIG. 12 shown with one of the pixel regions from FIG. 5 selected for further processing. In this example, pixel region 9 1300 is selected for further processing and is shown crosshatched.

Figure 14:
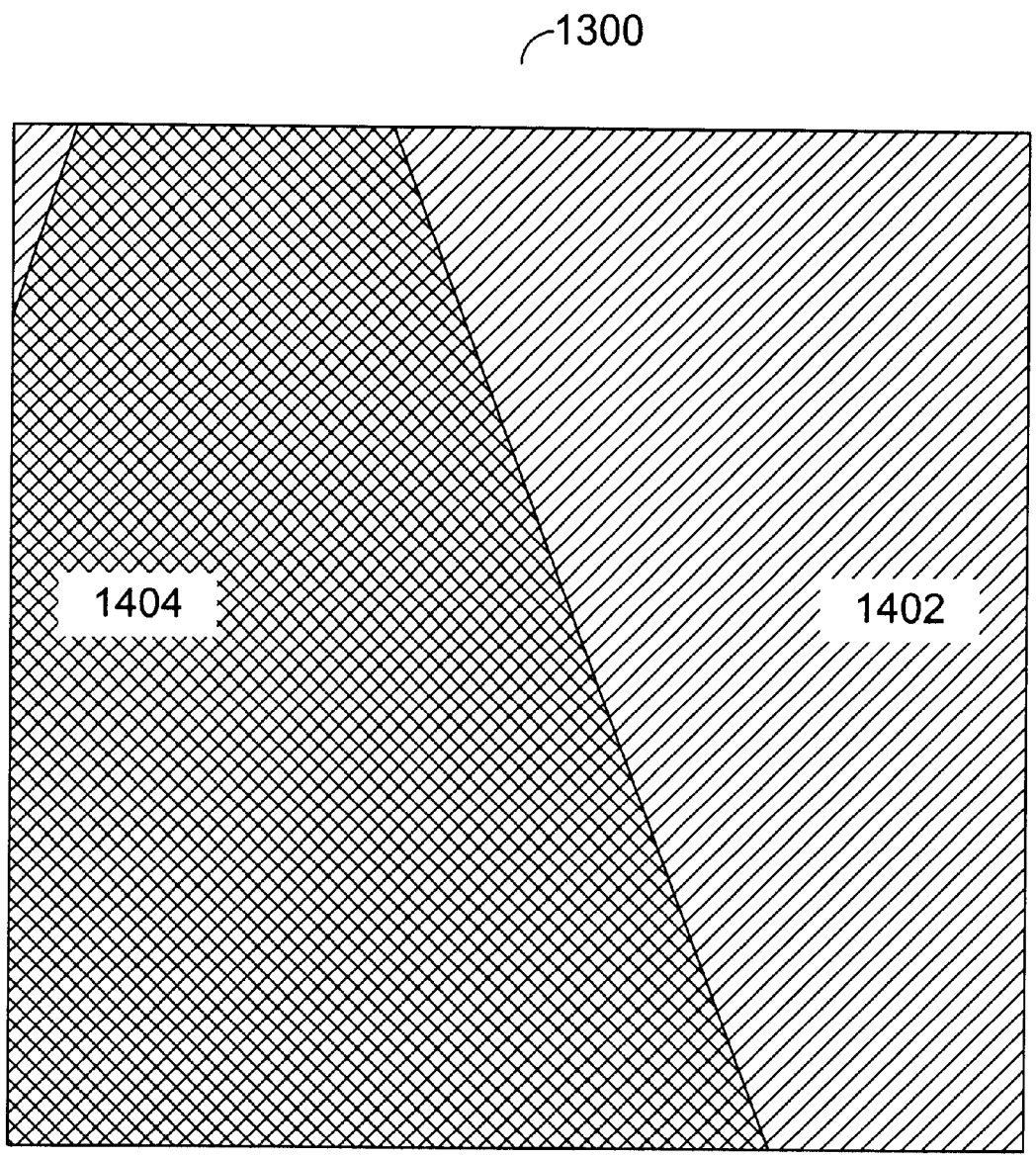
FIG. 14 is a graphical representation of the selected pixel region from FIG. 13 enlarged to show the portion of the example triangle from FIG. 4 contained within this region.

FIG. 14 is a graphical representation of the selected pixel region from FIG. 13 enlarged to show the portion of the example triangle from FIG. 4 contained within this pixel region 1300. Area within the triangle 1404 is shown with double crosshatching. Area outside the triangle 1402 is shown with single crosshatching.

Figure 15:
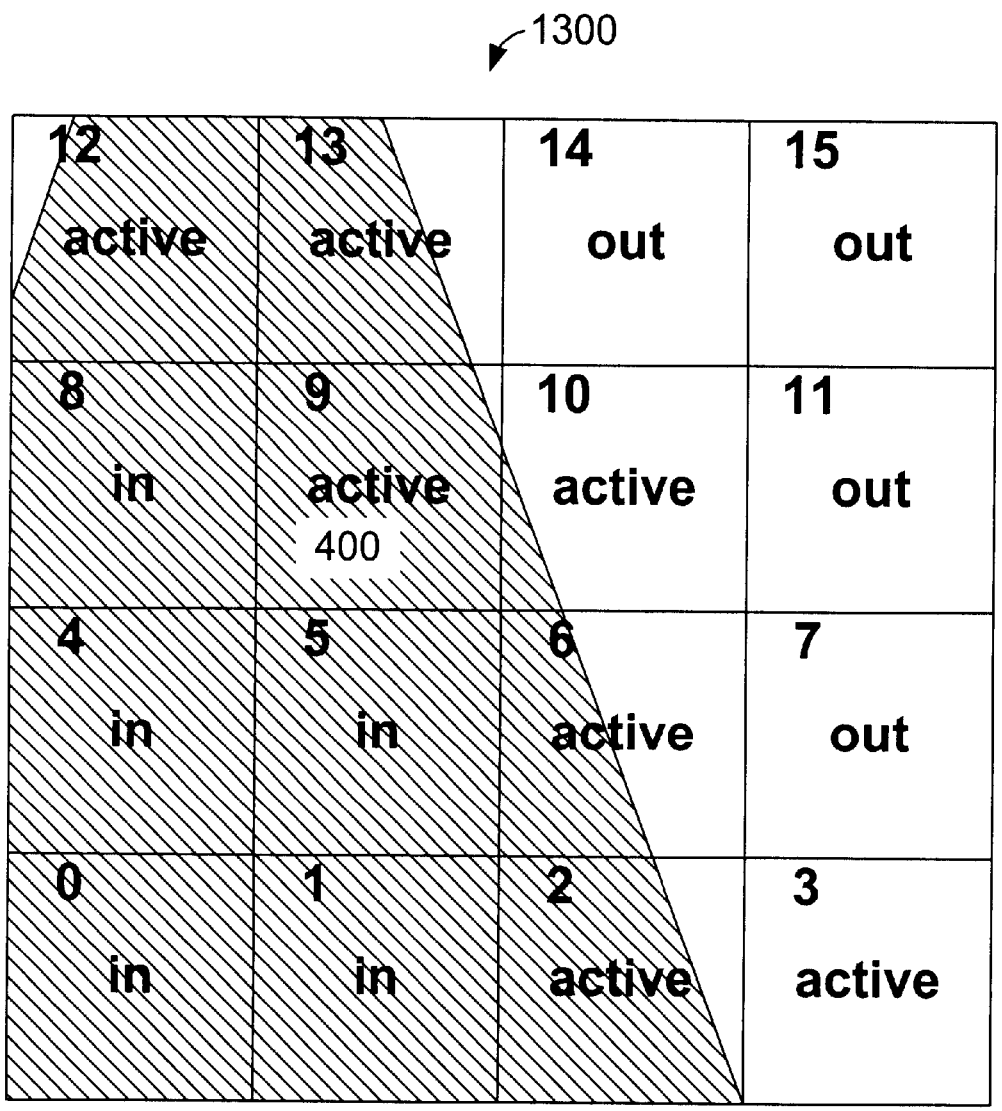
FIG. 15 is a graphical representation of the selected pixel region from FIG. 14 subdivided into pixel sub-regions showing the results of the calculations determining which sub-regions are within the example triangle from FIG. 4.

FIG. 15 is a graphical representation of the selected pixel region 1300 from FIG. 14 subdivided into pixel sub-regions showing the results of the calculations determining which sub-regions are within the example triangle 400 from FIG. 4. In an example embodiment, the selected pixel region 1300, is divided into sixteen pixel sub-regions labeled 0 through 15. Once again the process of extending the triangle edges into lines and determining for each line whether pixel sub-regions are within or outside of the triangle is used. The process steps shown in FIG. 6 through FIG. 12 are followed, with the 'in', 'out', and 'active' results shown in each of the pixel sub-regions in FIG. 15.

Figure 16:
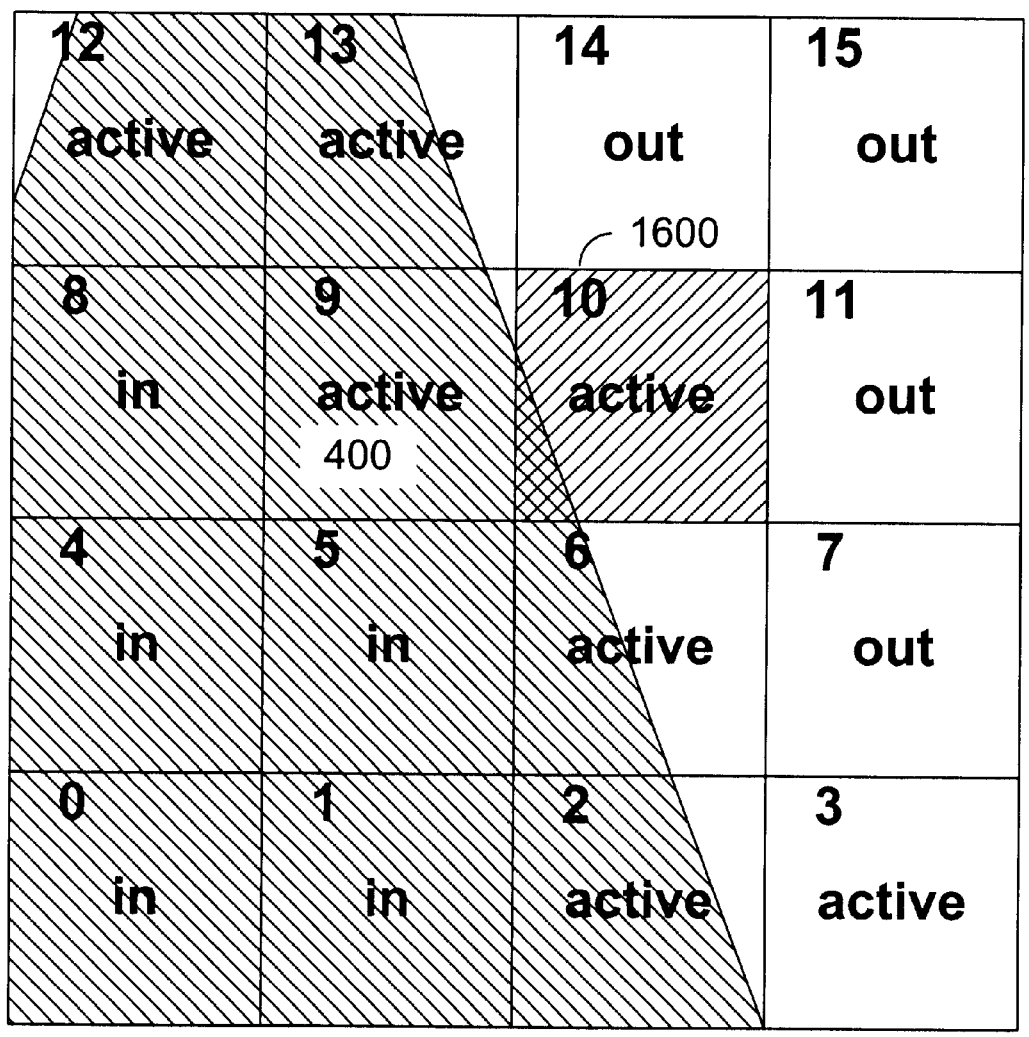
FIG. 16 is a graphical representation of the results from FIG. 15 shown with one of the pixel sub-regions selected for further processing.

FIG. 16 is a graphical representation of the results from FIG. 15 shown with one of the pixel sub-regions selected for further processing. In this example, pixel sub-region 10 1600 is selected for further processing and is shown crosshatched.

Figure 17:
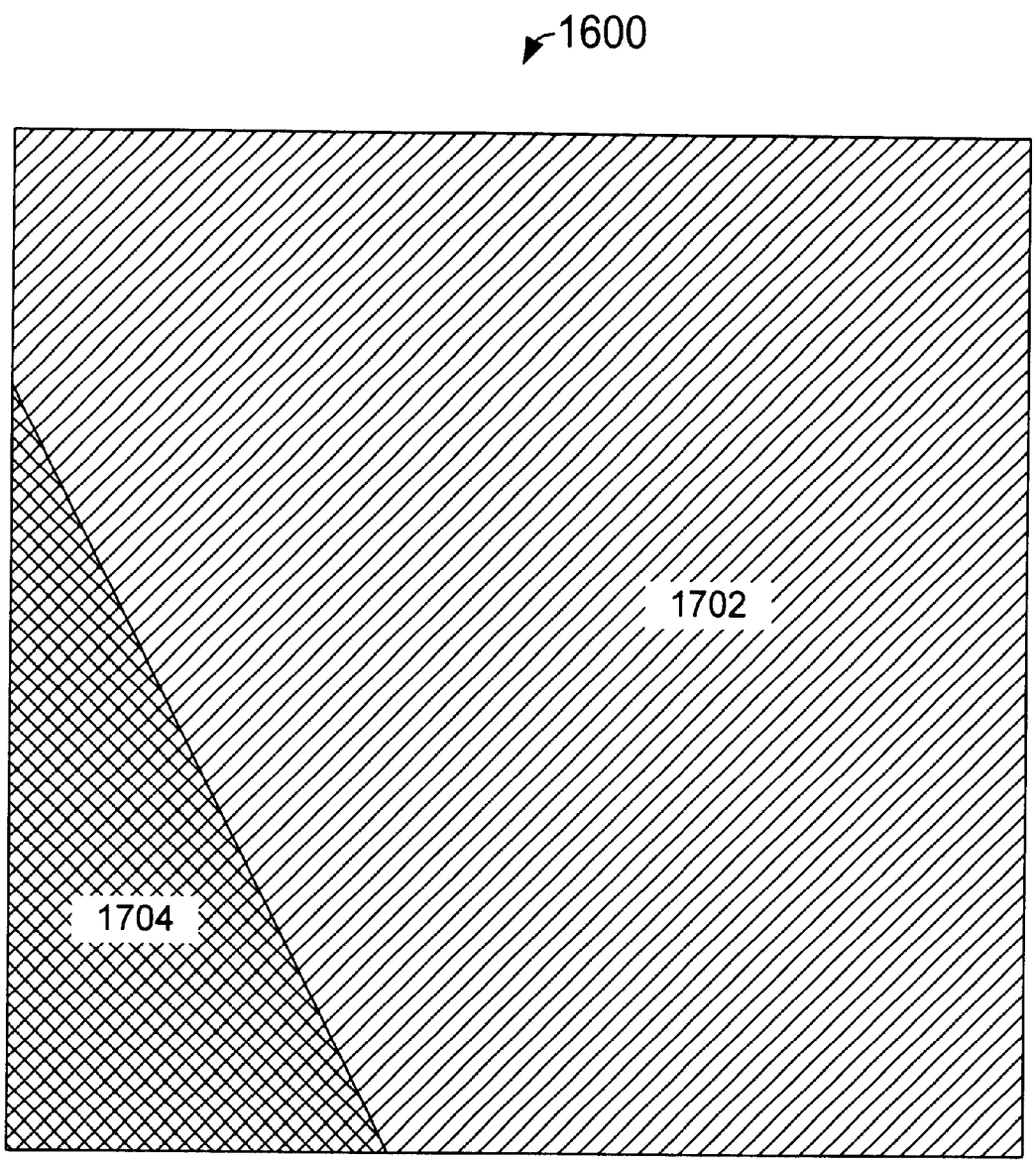
FIG. 17 is a graphical representation of the selected pixel sub-region from FIG. 16 enlarged to show the portion of the example triangle from FIG. 4 contained within this region.

FIG. 17 is a graphical representation of the selected pixel sub-region 1600 from FIG. 16 enlarged to show the portion of the example triangle 400 from FIG. 4 contained within this sub-region. Area within the triangle 1704 is shown with double crosshatching. Area outside the triangle 1702 is shown with single crosshatching.

Figure 18:
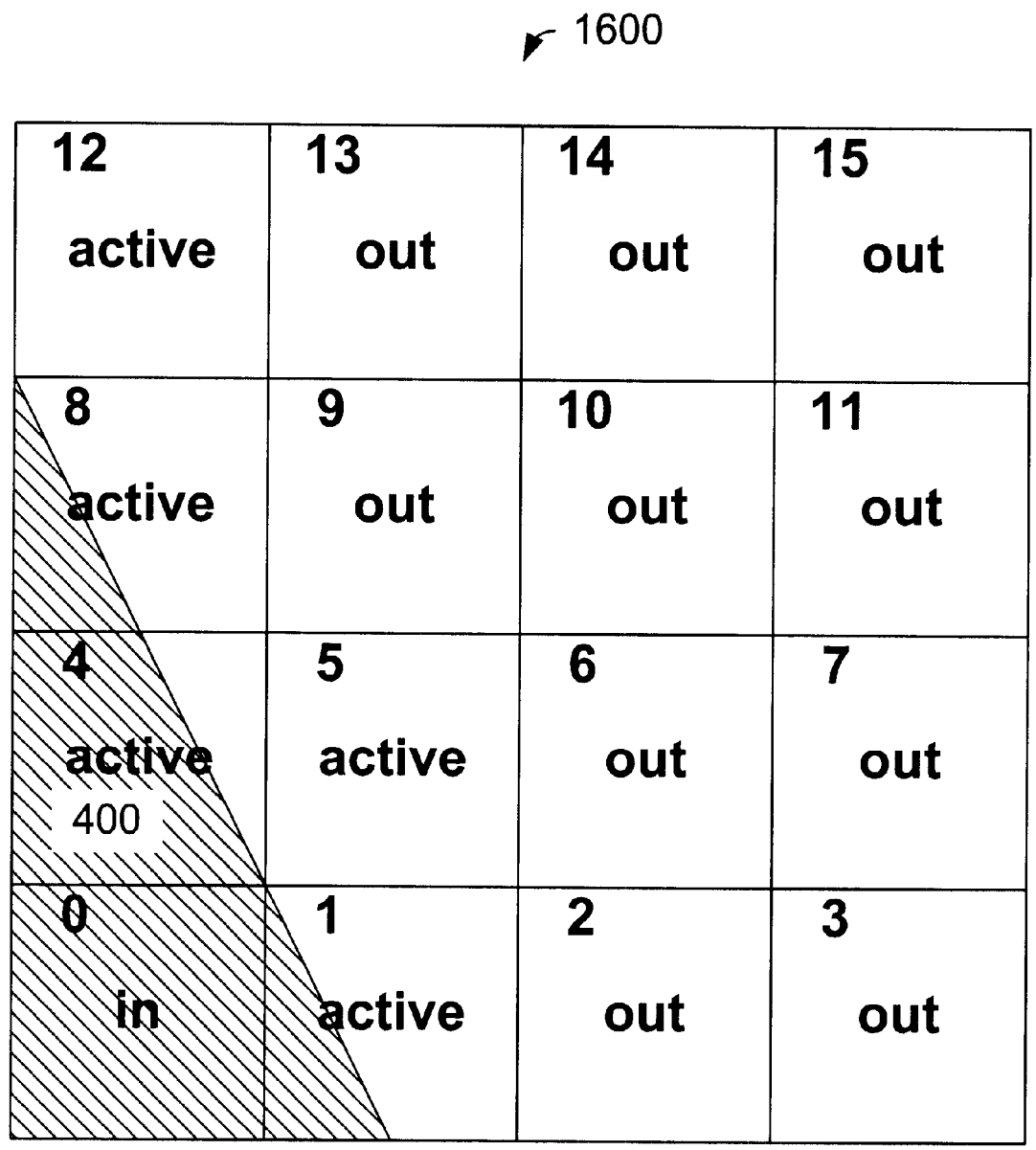
FIG. 18 is a graphical representation of the selected pixel sub-region from FIG. 17 subdivided into pixel sub-sub-regions showing the results of the calculations determining which sub-sub-regions are within the example triangle from FIG. 4.

FIG. 18 is a graphical representation of the selected pixel sub-region 1600 from FIG. 16 subdivided into pixel sub-sub-regions showing the results of the calculations determining which sub-sub-regions are within the example triangle 400 from FIG. 4. In an example embodiment, the selected pixel sub-region 1600, is divided into sixteen pixel sub-sub-regions labeled 0 through 15. Once again the process of extending the triangle edges into lines and determining for each line whether pixel sub-regions are within or outside of the triangle is used. The process steps shown in FIG. 6 through FIG. 12 are followed, with the 'in', 'out', and 'active' results shown in each of the pixel sub-sub-regions in FIG. 18. This hierarchical process of dividing the pixel regions into sub-regions may be followed as far as necessary in any given application. The final pixel regions may contain many pixels, several pixels, a single pixel, or sub-pixel regions. The current invention is directed to regions of sub-pixel dimensions.

Figure 19:
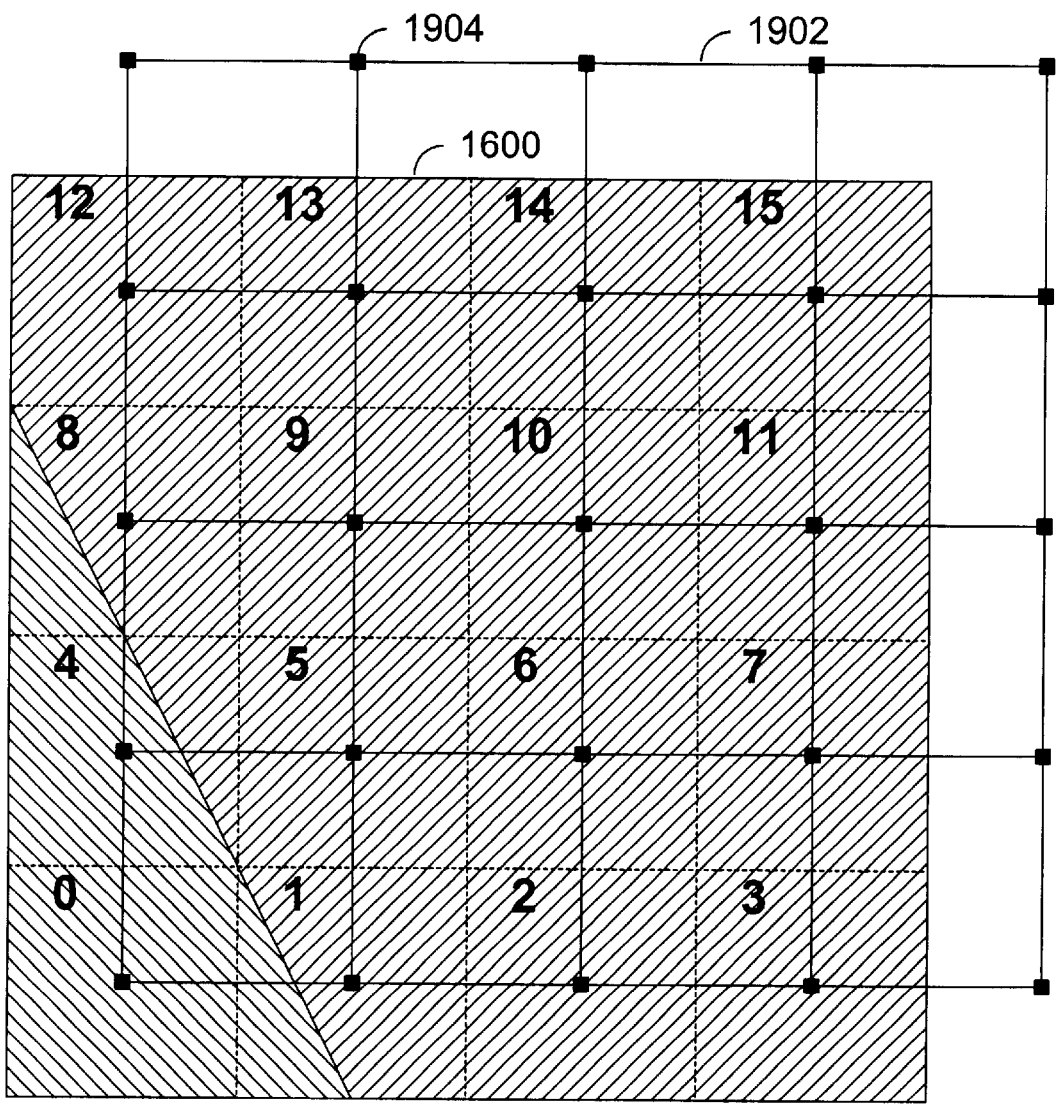
FIG. 19 is a graphical representation of the selected sub-region from FIG. 17 with the grid of sub-sub-regions offset such that the grid points are centered within the sub-sub-regions.

FIG. 19 is a graphical representation of the selected sub-region from FIG. 16 with the grid of sub-sub-regions 1902 offset such that the grid points 1904 are centered within the sub-sub-regions. In the case of FIG. 19, each of the sub-sub-regions represents a single pixel. Since the actual location of the pixel center is the center of each grid square, the sampling grid must be offset by one half pixel in both the X and Y directions to perform the calculations on the actual pixels. Once the grid is offset, each of the grid points 1904 is examined to determine if it is in or out of the triangle and the results are passed on for further processing or display.

The method explained so far in this detailed description is an efficient way of determining which pixels are contained within a given triangle. However, the method only determines whether the pixel centers are within the triangle. It does not allow for any shading of edge pixels according to how much of the triangle is contained within the small area that each pixel represents.

Figure 20:
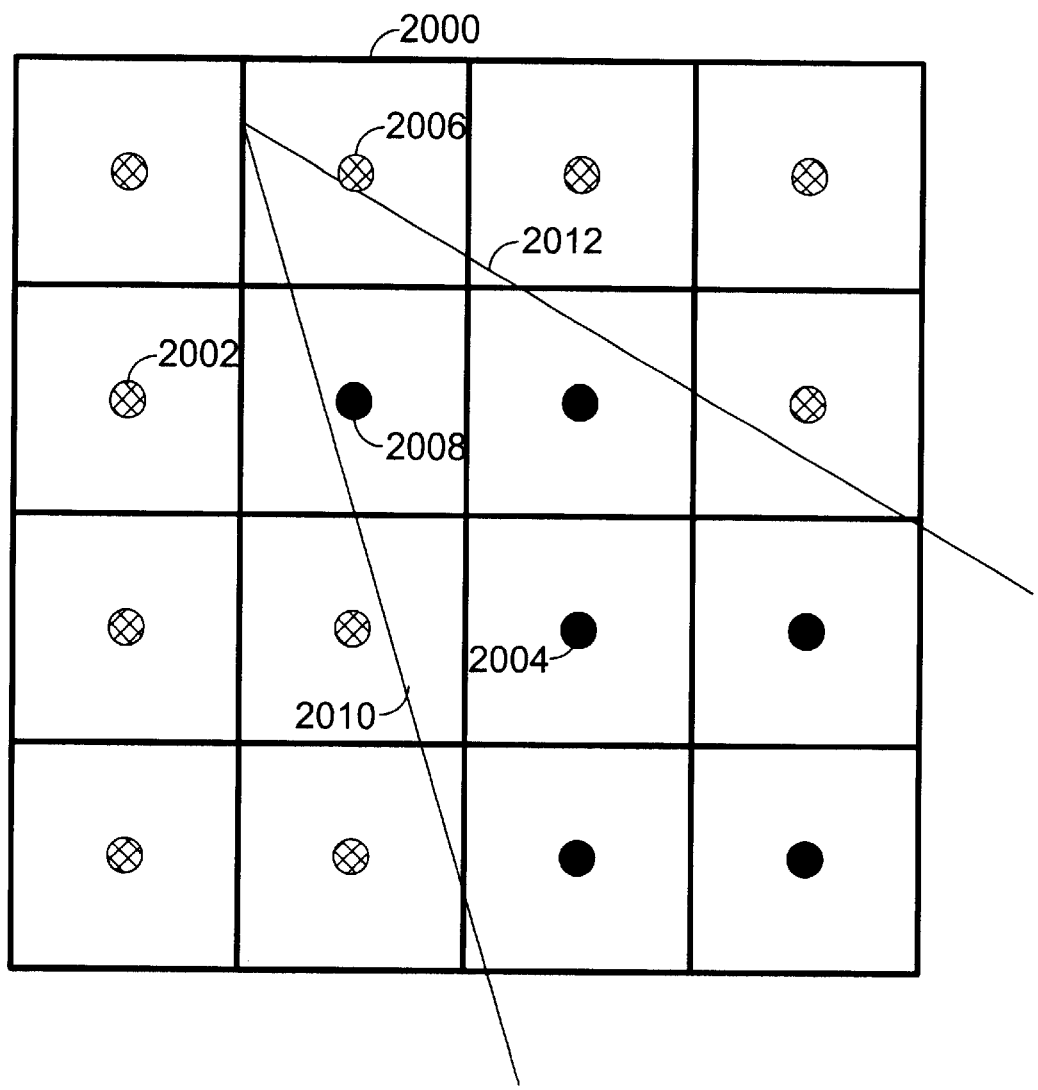
FIG. 20 is a graphical representation of an example triangle on a grid of sixteen pixels.

FIG. 20 is a graphical representation of an example triangle on a grid of sixteen pixels. In FIG. 20 the sample grid 2000 is shown surrounding each pixel. In this example, two edges of a triangle, a first edge 2010, and a second edge 2012 are shown with the pixel locations shown. Pixel 2002 is completely outside of the triangle and calculation of its color value need not include any reference to the triangle. Pixel 2004 is contained completely within the triangle and calculation of its color value need not include any reference to the background. Pixel 2006 is outside of the triangle, however the second edge 2012 crosses through its grid area. Therefore, pixel 2006 is on the edge of the triangle and calculation of its color value must include reference to both the triangle and the background. Pixel 2008 is within the triangle, however, the first edge 2010 crosses through its grid area. Therefore, pixel 2008 is on the edge of the triangle and calculation of its color value must include reference to both the triangle and the background.

In a system without anti-aliasing, pixel 2006 would just be set to the background color and pixel 2008 would be set to the triangle color. Some anti-aliasing techniques use calculations from the position of the triangle edges to set the color value of the edge pixels. For example, they may bias the color of the edge pixels by how far from the edge each pixel center is.

Given the hierarchical tiler technique described in FIG. 4 through FIG. 19, it is possible to use the same technique to selectively over-sample the pixels along the edges of the triangle to generate color values for the edge pixels.

Figure 21:
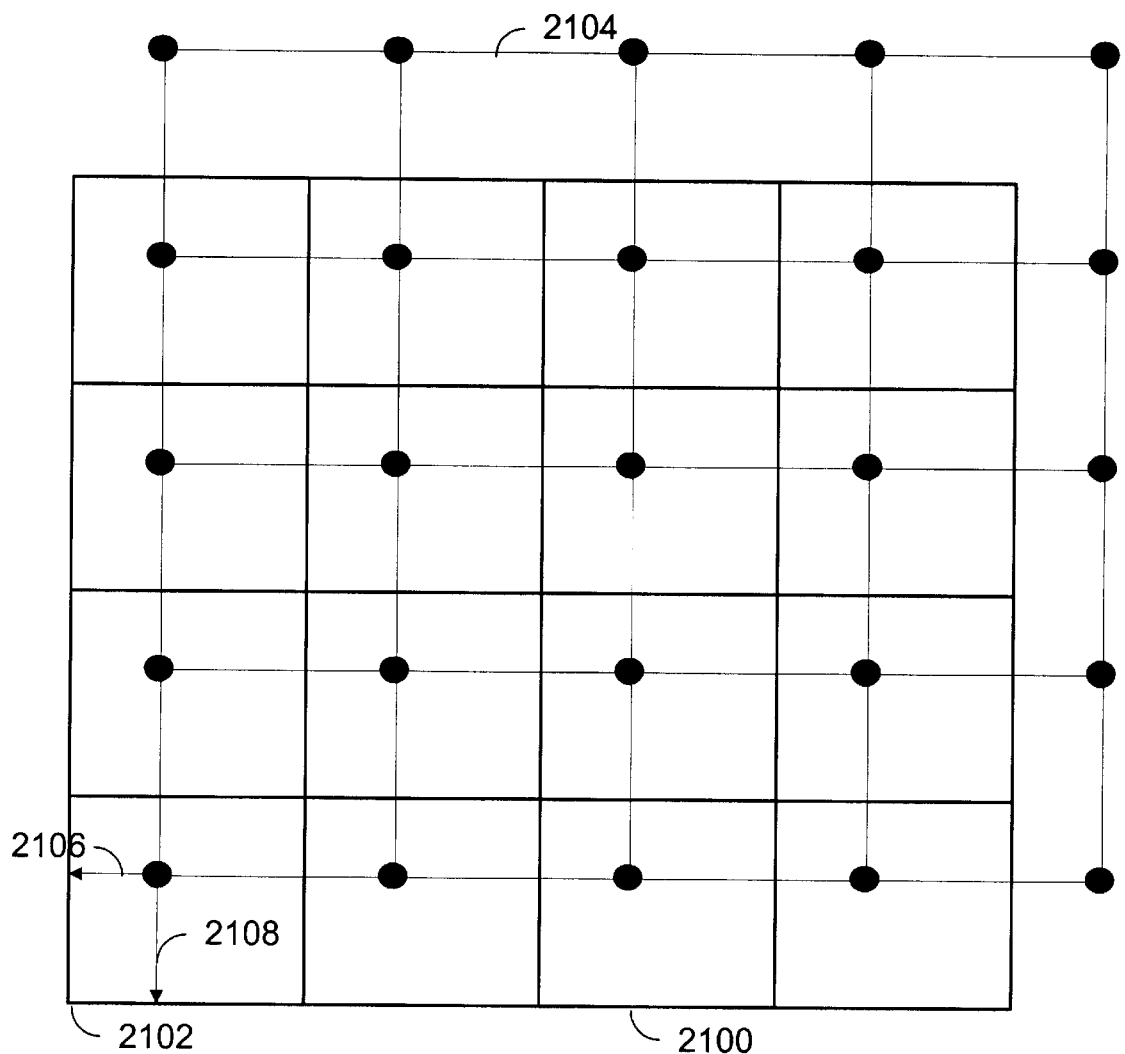
FIG. 21 is a graphical representation of an example region of pixels divided into sub-regions of pixels with the grid of sub-regions offset by an example amount in the X-direction and a different example amount in the Y-direction.

FIG. 21 is a graphical representation of an example region of pixels divided into sub-regions of pixels 2100 with the grid of sub-regions 2104 offset by an example amount in the X-direction and a different example amount in the Y-direction. In this example, the grid is offset by an X amount 2106 and a Y amount 2108. The same techniques may now be used to calculate which grid points are within a polygon. The data is then generated for each of the pixels offset by (x, y) where (x, y) are sub-pixel values. This technique is then used repeatedly with different X amounts 2106 and Y amounts 2108 to over-sample the pixels along the polygon edges. Note that the (x, y) values used do not have to form a square array of points. In fact, by performing the calculations with a sparsely populated array of (x, y) values, image quality approaching that of full over-sampling techniques may be gained while requiring less computation than full over-sampling techniques.

Figure 22:
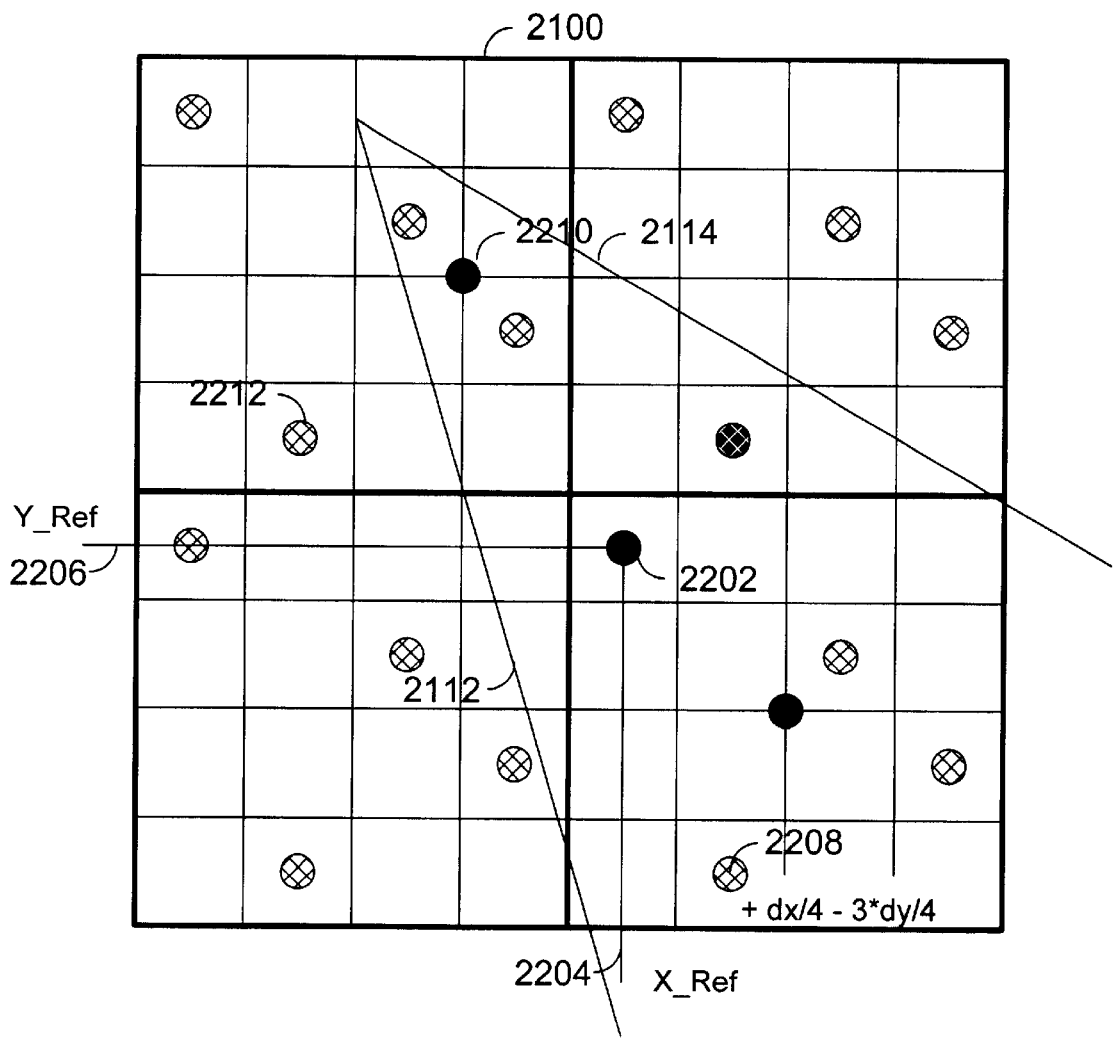
FIG. 22 is a graphical representation of the example from FIG. 20 showing a reference pixel and the calculations used to determine the locations of other pixels with respect to the reference pixel.

FIG. 22 is a graphical representation of the example from FIG. 20 showing a reference location and the calculations used to determine the locations of other sub-pixels with respect to the reference locations. In this example, a reference location 2202 is chosen within a four-pixel array 2100 with each pixel subdivided into sixteen sub-pixel regions. The first edge 2112 and second edge 2114 of an example polygon are shown on the array of regions. The reference location 2202 is represented by an X location 2204 (X_Ref) and a Y location 2206 (Y_Ref). One possible sub-pixel location 2208 is shown with the calculations used to determine its location with respect to the reference location 2202. The sub-pixel location 2208 is one sub-region to the right of the reference location 2202, so its X location is X_Ref+dx/4 where dx is the X dimension of a pixel. It is three sub-regions below the reference location 2202, so its Y location is Y_Ref−3*dy/4 where dy is the Y dimension of a pixel.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for performing anti-aliasing in a computer graphics display system comprising the steps of:
    a) sub-dividing a display region into sub-pixel regions;
    b) for fewer than all of said sub-pixel regions within said display regions, determining whether a particular sub-pixel region is entirely outside of a primitive, entirely inside of said primitive, or partially inside of said primitive, using an offset grid;
    c) calculating a color for said display region from said sub-pixel region determinations;
    d) displaying said color for said display region;
    e) partitioning said display into display regions;
    f) selecting a display region through which a primitive edge passes; and
    g) repeating step f) and steps a) through d) for each display region through which a primitive edge passes.

2. The method recited in claim 1 further comprising the steps of:
    h) calculating a color for each display region through which no primitive edges pass; and
    i) displaying said colors for said display regions through which no primitive edges pass.

3. The method recited in claim 1 further comprising the steps of:
    h) calculating a color for each display region completely enclosed by said primitive; and
    i) displaying said color for said display region completely enclosed by said primitive.

4. The method recited in claim 1 further comprising the steps of:
    h) calculating a color for each display region completely outside of said primitive; and
    i) displaying said color for said display region completely outside of said primitive.

5. A computer program storage medium readable by a computer, tangibly embodying a computer program of instructions executable by the computer to perform method steps for anti-aliasing in a computer graphics display system, the steps comprising:
    a) sub-dividing a display region into sub-pixel regions;
    b) for fewer than all of said sub-pixel regions within said display region, determining whether a particular sub-pixel region is entirely outside of a primitive, entirely inside of said primitive, or partially inside of said primitive, using an offset grid;
    c) calculating a color for said display region from said sub-pixel region determinations;
    d) displaying said color for said display region.
    e) partitioning said display into display regions;
    f) selecting a display region through which a primitive edge passes; and
    g) repeating step f) and steps a) through d) for each display region through which a primitive edge passes.

6. A computer program storage medium as recited in claim 5, the steps further comprising:
    h) calculating a color for each display region through which no primitive edges pass; and
    i) displaying said colors for said display regions through which no primitive edges pass.

7. The computer program storage medium recited in claim 5, the steps further comprising:
    h) calculating a color for each display region completely enclosed within a primitive; and
    i) displaying said colors for said display regions completely enclosed within said primitive.

8. The computer program storage medium recited in claim 5, the steps further comprising:
    h) calculating a color for each display region completely outside of a primitive; and
    i) displaying said colors for said display regions completely outside of said primitive.

9. A device for anti-aliasing primitives for display by a computer graphics display system comprising:
    a setup block that receives primitive data from a computer graphics front end block and outputs primitive edge data;
    a partition block that partitions said display into regions;
    a calculation block electrically connected with said partition block, that receives said primitive edge data from said setup block, and determines which of said regions contain a primitive edge;
    a sub-pixel partition block electrically connected with said calculation block, that partitions said regions containing a primitive edge into sub-pixel regions;
    a sub-pixel calculation block electrically connected with said sub-pixel partition block, that receives said sub-pixel regions from said sub-pixel partition block and, for fewer than all of said sub-pixel regions, determines whether a particular sub-pixel region is entirely outside of said primitive, entirely inside of said primitive, or partially inside of said primitive;
    a sub-pixel color calculation block electrically connected with said sub-pixel calculation block that receives said sub-pixel determinations from said sub-pixel calculation block and calculates a color data for said region from said sub-pixel region determinations;
    a display unit that receives said color data for said regions from said sub-pixel color calculation block, formats said color data for display, and outputs said formatted color data to a computer graphics display.

10. A device for anti-aliasing primitives for display by a computer graphics display system as recited in claim 9 wherein said sub-pixel calculation block uses an offset grid to determine whether a particular sub-pixel region is entirely outside of said primitive, entirely inside of said primitive, or partially inside of said primitive.

11. A device for anti-aliasing primitives for display by a computer graphics display system as recited in claim 10 wherein said hierarchical scan converter block further includes:
    a region color calculation block electrically connected to said partition block, said calculation block, and said display unit that receives region data from said partition block and calculates a color for each region that said calculation block determines no primitive edges pass.

12. The device for anti-aliasing primitives for display by a computer graphics display system recited in claim 10 wherein said hierarchical scan converter block further includes:

a region color calculation block electrically connected to said partition block, said calculation block, and said display unit that receives region data from said partition block and calculates a color for each region that said calculation block determines is completely enclosed by a primitive.

13. The device for anti-aliasing primitives for display by a computer graphics display system recited in claim 10 wherein said hierarchical scan converter block further includes:

a region color calculation block electrically connected to said partition block, said calculation block, and said display unit that receives region data from said partition block and calculates a color for each region that said calculation block determines is completely outside of a primitive.

* * * * *